(12) United States Patent
Smith

(10) Patent No.: US 9,278,690 B2
(45) Date of Patent: Mar. 8, 2016

(54) AUTONOMOUS MOBILE ROBOT

(71) Applicant: iRobot Corporation, Bedford, MA (US)

(72) Inventor: Jennifer Smith, Beverly, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/547,227

(22) Filed: Nov. 19, 2014

(65) Prior Publication Data

US 2015/0166060 A1    Jun. 18, 2015

Related U.S. Application Data

(60) Provisional application No. 61/917,562, filed on Dec. 18, 2013.

(51) Int. Cl.
| | |
|---|---|
| *G01C 22/00* | (2006.01) |
| *B60W 30/09* | (2012.01) |
| *G01S 15/88* | (2006.01) |
| *G01S 15/93* | (2006.01) |
| *G01S 7/54* | (2006.01) |
| *G01S 15/87* | (2006.01) |
| *G01S 13/88* | (2006.01) |

(52) U.S. Cl.
CPC ........ *B60W 30/09* (2013.01); *G01S 7/54* (2013.01); *G01S 15/876* (2013.01); *G01S 15/88* (2013.01); *G01S 15/931* (2013.01); *G01S 13/881* (2013.01)

(58) Field of Classification Search
CPC ........ B60W 30/09; G01S 7/54; G01S 15/876; G01S 15/88; G01S 15/931
See application file for complete search history.

(56) References Cited

U.S. PATENT DOCUMENTS

| | | | |
|---|---|---|---|
| 1,900,885 A | 3/1933 | Smellie | |
| 4,710,020 A | 12/1987 | Maddox et al. | |
| 5,165,064 A | 11/1992 | Mattaboni | |
| 5,502,638 A | 3/1996 | Takenaka | |
| 5,621,291 A * | 4/1997 | Lee | A47L 5/30 180/167 |
| 5,867,800 A * | 2/1999 | Leif | A47L 11/4011 180/167 |
| 5,935,179 A | 8/1999 | Kleiner et al. | |
| 5,995,884 A | 11/1999 | Allen et al. | |

(Continued)

FOREIGN PATENT DOCUMENTS

WO    WO-2013036284    3/2013

OTHER PUBLICATIONS

William Strunk, Jr., and E. B. White, The Element of Style, 3$^{rd}$ Edition, 1979, all pages.*

(Continued)

*Primary Examiner* — Calvin Cheung
(74) *Attorney, Agent, or Firm* — Honigman Miller Schwartz and Cohn LLP

(57) ABSTRACT

A robot includes a robot body having forward and rearward portions, a sonar system, a drive system, and a control system. The sonar system is disposed on the robot body and has an array of emitters and an array of receivers arranged along a forward surface of the forward portion of the robot body. The emitters emit a sound wave and the receivers receive reflections of the sound wave. The array of emitters includes an odd number of emitters and the array of receivers includes an even number of receivers. The drive system supports the robot body and is configured to maneuver the robot across a floor surface along a path. The control system is supports by the robot body and is in communication with the drive system and the sonar system. The control system processes sensor signals received from the array of receivers.

20 Claims, 18 Drawing Sheets

(56) References Cited

U.S. PATENT DOCUMENTS

| | | | |
|---|---|---|---|
| 6,099,661 A | 8/2000 | Conrad | |
| 6,173,233 B1 | 1/2001 | Janutka et al. | |
| 6,389,329 B1 | 5/2002 | Colens | |
| 6,532,404 B2 | 3/2003 | Colens | |
| 6,594,844 B2 | 7/2003 | Jones | |
| 6,605,156 B1 | 8/2003 | Clark et al. | |
| 6,671,592 B1 | 12/2003 | Bisset et al. | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,836,701 B2 | 12/2004 | McKee | |
| 6,883,201 B2 | 4/2005 | Jones et al. | |
| 6,965,209 B2 | 11/2005 | Jones et al. | |
| 6,971,140 B2 | 12/2005 | Kim | |
| 7,024,278 B2 | 4/2006 | Chiappetta et al. | |
| 7,079,923 B2 | 7/2006 | Abramson et al. | |
| 7,133,746 B2 | 11/2006 | Abramson et al. | |
| 7,155,308 B2 | 12/2006 | Jones | |
| 7,167,775 B2 | 1/2007 | Abramson et al. | |
| 7,173,391 B2 | 2/2007 | Jones et al. | |
| 7,196,487 B2 | 3/2007 | Jones et al. | |
| 7,332,890 B2 | 2/2008 | Cohen et al. | |
| 7,388,343 B2 | 6/2008 | Jones et al. | |
| 7,389,156 B2 | 6/2008 | Ziegler et al. | |
| 7,441,298 B2 | 10/2008 | Svendsen et al. | |
| 7,448,113 B2 | 11/2008 | Jones et al. | |
| 7,568,259 B2 | 8/2009 | Yan | |
| 7,571,511 B2 | 8/2009 | Jones et al. | |
| 7,578,020 B2 | 8/2009 | Jaworski et al. | |
| 7,636,982 B2 | 12/2009 | Jones et al. | |
| 7,663,333 B2 | 2/2010 | Jones et al. | |
| 7,706,917 B1 | 4/2010 | Chiappetta et al. | |
| 7,761,954 B2 | 7/2010 | Ziegler et al. | |
| 7,860,608 B2 * | 12/2010 | Lee | G05D 1/0219 700/245 |
| 8,239,992 B2 | 8/2012 | Schnittman et al. | |
| 8,295,125 B2 | 10/2012 | Chiappetta et al. | |
| 8,347,444 B2 | 1/2013 | Schnittman et al. | |
| 8,370,985 B2 | 2/2013 | Schnittman et al. | |
| 8,600,553 B2 | 12/2013 | Svendsen et al. | |
| 8,601,643 B2 | 12/2013 | Eriksson | |
| 8,661,605 B2 | 3/2014 | Svendsen et al. | |
| 8,839,477 B2 | 9/2014 | Schnittman et al. | |
| 8,954,192 B2 | 2/2015 | Ozick et al. | |
| 8,978,196 B2 | 3/2015 | Svendsen et al. | |
| 8,989,947 B2 | 3/2015 | Wethern | |
| 2002/0016649 A1 | 2/2002 | Jones | |
| 2002/0114218 A1 | 8/2002 | Lee et al. | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0074038 A1 | 4/2004 | Im et al. | |
| 2004/0117064 A1 | 6/2004 | McDonald | |
| 2004/0133316 A1 | 7/2004 | Dean | |
| 2004/0187457 A1 | 9/2004 | Colens | |
| 2004/0207355 A1 | 10/2004 | Jones et al. | |
| 2005/0021181 A1 | 1/2005 | Kim et al. | |
| 2005/0067994 A1 | 3/2005 | Jones et al. | |
| 2005/0156562 A1 | 7/2005 | Cohen et al. | |
| 2005/0165508 A1 | 7/2005 | Kanda et al. | |
| 2005/0166356 A1 | 8/2005 | Uehigashi | |
| 2005/0192707 A1 | 9/2005 | Park et al. | |
| 2005/0204717 A1 | 9/2005 | Colens | |
| 2005/0213082 A1 | 9/2005 | DiBernardo et al. | |
| 2005/0278888 A1 | 12/2005 | Reindle et al. | |
| 2006/0005344 A1 | 1/2006 | Uehigashi | |
| 2006/0010638 A1 | 1/2006 | Shimizu et al. | |
| 2006/0190133 A1 | 8/2006 | Konandreas et al. | |
| 2006/0259194 A1 | 11/2006 | Chiu | |
| 2007/0061041 A1 | 3/2007 | Zweig | |
| 2007/0086615 A1 | 4/2007 | Cheney | |
| 2007/0244610 A1 | 10/2007 | Ozick et al. | |
| 2007/0266508 A1 | 11/2007 | Jones et al. | |
| 2008/0091304 A1 | 4/2008 | Ozick et al. | |
| 2008/0140255 A1 | 6/2008 | Ziegler et al. | |
| 2008/0155768 A1 | 7/2008 | Ziegler et al. | |
| 2008/0184518 A1 | 8/2008 | Taylor et al. | |
| 2008/0276407 A1 | 11/2008 | Schnittman et al. | |
| 2008/0276408 A1 | 11/2008 | Gilbert, Jr. et al. | |
| 2008/0281470 A1 | 11/2008 | Gilbert, Jr. et al. | |
| 2008/0307590 A1 | 12/2008 | Jones et al. | |
| 2010/0037418 A1 * | 2/2010 | Hussey | A47L 5/30 15/319 |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0286825 A1 | 11/2010 | Rew | |
| 2010/0313912 A1 | 12/2010 | Han et al. | |
| 2012/0269037 A1 | 10/2012 | Morozov | |
| 2013/0263889 A1 | 10/2013 | Yoon et al. | |
| 2015/0020326 A1 | 1/2015 | Schnittman et al. | |

OTHER PUBLICATIONS

International Search Report for related PCT application No. PCT/US2014/066351 dated Mar. 23, 2015.

* cited by examiner

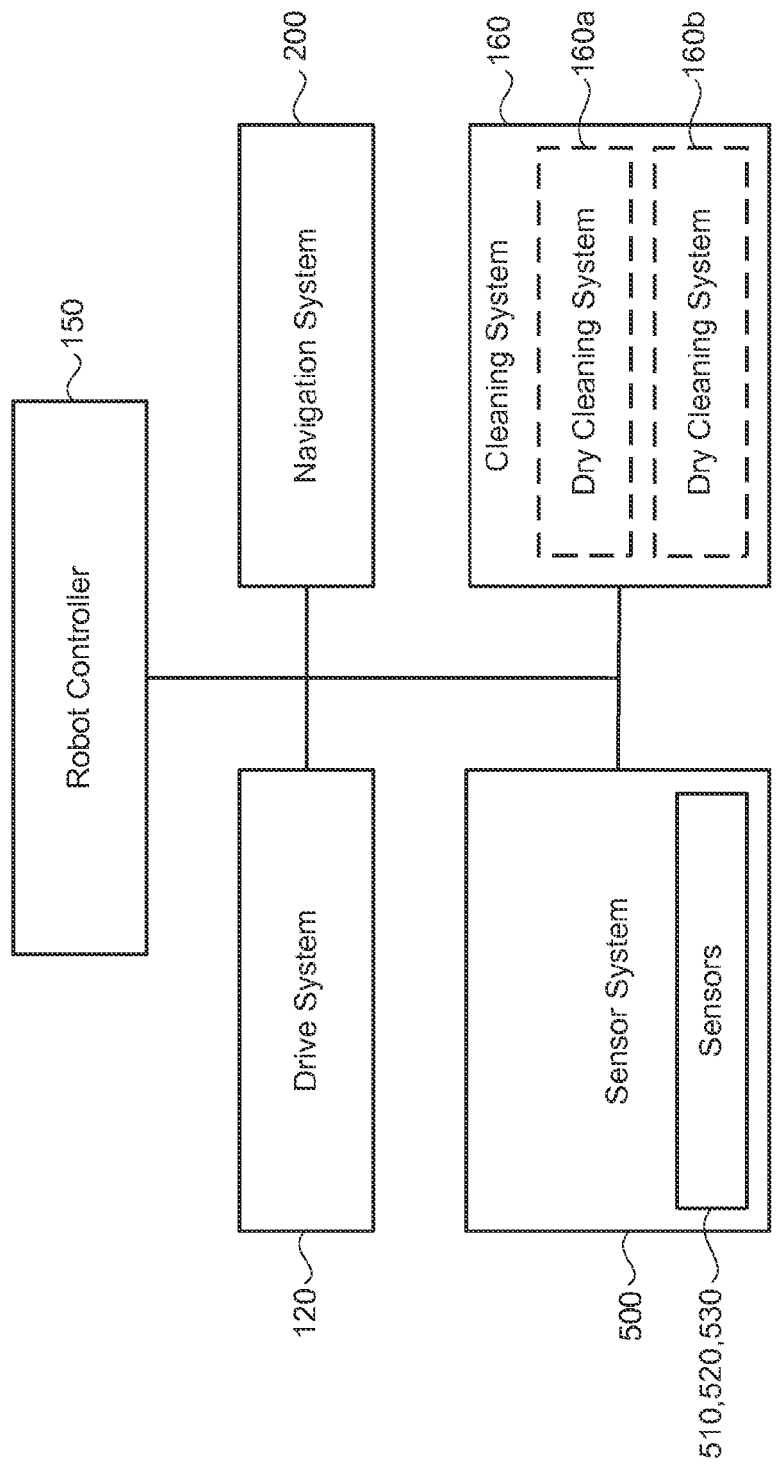

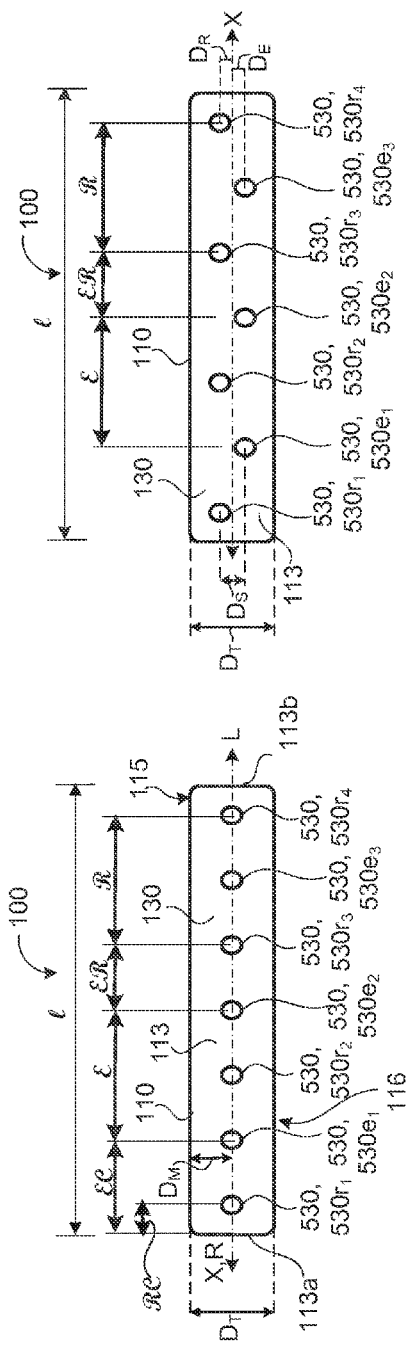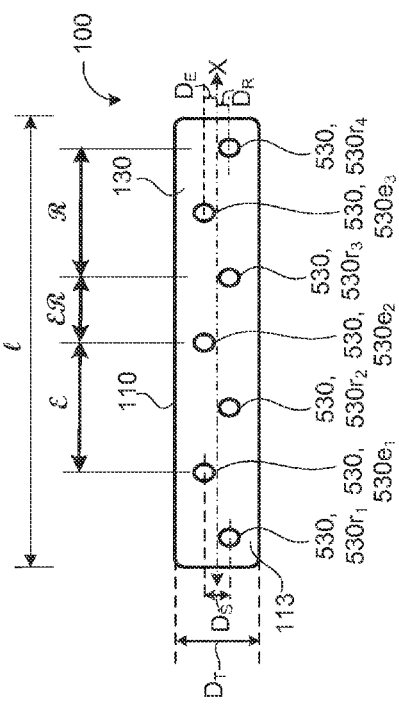

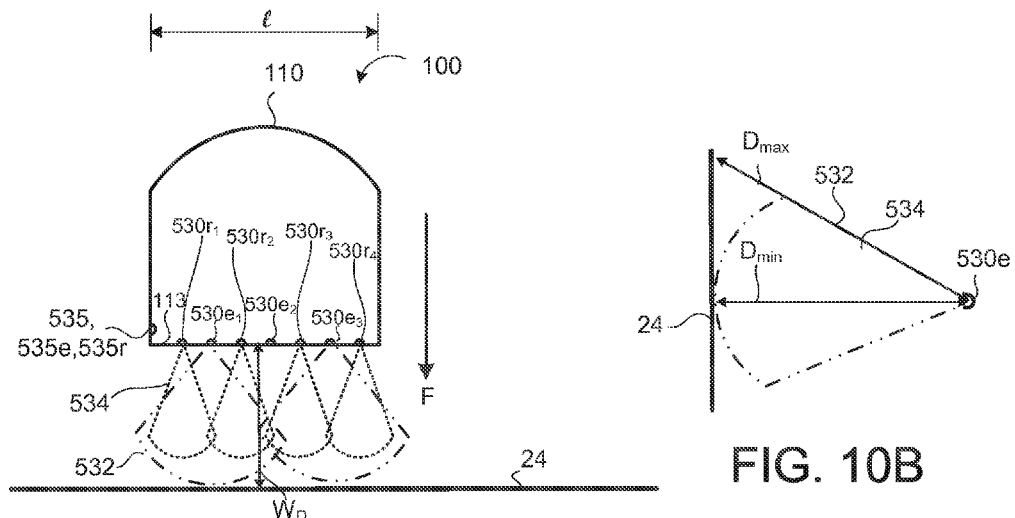
FIG. 10A
FIG. 10B
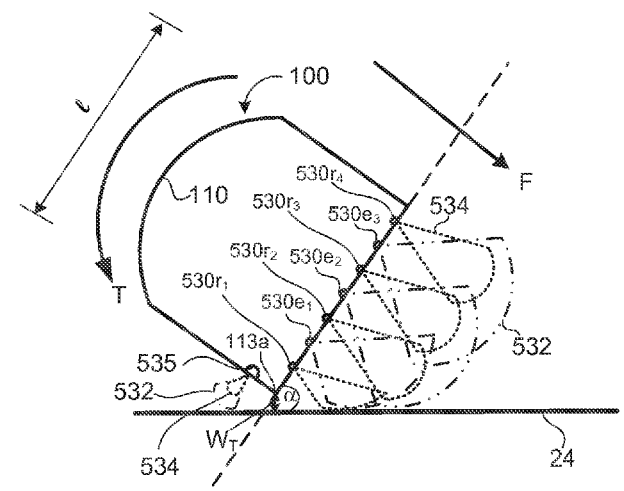
FIG. 10C

AUTONOMOUS MOBILE ROBOT

CROSS REFERENCE TO RELATED APPLICATIONS

This U.S. patent application claims priority under 35 U.S.C. §119(e) to U.S. Provisional Application 61/917,562, filed on Dec. 18, 2013, which is hereby incorporated by reference in its entirety.

TECHNICAL FIELD

This disclosure relates to autonomous mobile robots.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Mobile robots can be found in industry, military and security environments. They also appear as consumer products for entertainment or to perform certain tasks like vacuum cleaning and home assistance.

A vacuum cleaner robot generally uses an air pump to create a partial vacuum for lifting dust and dirt from a floor or supporting surface. The vacuum cleaner robot typically collects dirt either in a dust bag or a cyclone for later disposal. Vacuum cleaners, which are used in homes as well as in industry, exist in a variety of sizes and models, such as small battery-operated hand-held devices, domestic central vacuum cleaners, huge stationary industrial appliances that can handle several hundred liters of dust before being emptied, and self-propelled vacuum trucks for recovery of large spills or removal of contaminated soil.

Autonomous robotic vacuum cleaners generally navigate a living space and common obstacles while vacuuming the floor. Autonomous robotic vacuum cleaners may include sensors for identifying and avoiding obstacles, such as walls, furniture, or stairs. Some robots may use a variety of sensors to obtain data about its surrounding environment, for example, for navigation or obstacle detection and obstacle avoidance.

SUMMARY

One aspect of the disclosure provides an autonomous mobile robot that includes a robot body, a sonar system, a side ranging sensor, at least one cliff sensor, a drive system and a control system. The robot body defines a forward drive direction and has forward and rearward portions with respect to the forward drive direction. The forward portion has a substantially straight forward surface bounded by corners positioned along a circumdiameter of the robot body. The sonar system is an array of sonar emitters and an array of sonar receivers disposed on the robot body at set distances along the forward surface. The emitters emit a sound wave and the receivers receive reflections of the sound wave. Each emitter is disposed adjacent a receiver and each emitter and receiver pair measures a distance from the forward surface to a wall. The side ranging sensor is disposed on a side of the robot body and is positioned adjacent a corner of the forward surface. Additionally, the drive system supports the robot body and is configured to maneuver the robot across a floor surface along a path. The control system is supported by the robot body and in communication with the drive system, the sonar system, the side ranging sensor and the at least one cliff sensor disposed on a bottom surface of the robot body. The control system processes sensor signals received from the array of receivers, calculates an angle of approach of the forward surface to the wall, calculates a closest corner distance to the wall, turns the robot body to avoid collision, and aligns the forward drive direction parallel to the wall with the robot body traveling adjacent the wall at a threshold wall following distance.

Implementations of the disclosure may include one or more of the following features. In some implementations, the array of emitters includes an odd number of emitters and the array of receivers includes an even number of receiver, where each emitter is disposed between two receivers. In some implementations, the array of emitters includes three emitters and the array of receivers includes four receivers. Additionally or alternatively, the control system may execute a sonar emission cycle that has a threshold duration of time separating each emitted sound wave. In some implementations, the duration of time separating each emitted sound wave is between about 5 milliseconds and about 25 milliseconds. In some implementations, the duration of time separating each emitted sound wave is about 15 milliseconds. Additionally, the sonar emission cycle may have a cycle completion period of time of between about 30 milliseconds and about 60 milliseconds. In some implementations, the sonar emission cycle may have a cycle completion period of time of 45 milliseconds.

In some implementations, the robot further includes a side brush adjacent one of the corners of the forward face and extending beyond the perimeter of the robot body. In some implementations, the robot includes a bump sensor disposed on the forward portion and in communication with the controller. Actuation of the bump sensor indicates the presence of an overhand closer than a recessed wall portion detected by the sonar emitter and receiver arrays. In the presence of an overhang, the robot calibrates a signal value threshold that corresponds to a second wall following distance from the robot to the recessed portion of the wall. The second wall following distance allows the robot to travel adjacent the closest part of the overhang at a distance equal to the threshold wall following distance.

The control system may execute a direction-lock drive command. The direction-lock drive command avoids a recently traveled path until the robot travels a threshold distance away from a location. When the robot detects a closest obstacle, the control system executes a direction-lock drive override command, and the direction-lock drive override command maintains a turn direction until the robot travels a threshold distance, regardless of the position of the closest detected obstacle.

In some implementations, the robot body defines a transverse axis perpendicular to the forward drive direction. The forward body portion may have a front face substantially parallel to the transverse axis. Additionally, the drive system may include right and left driven wheel modules substantially opposed along the transverse axis adjacent right and left sides of the robot body with respect to the forward drive direction. In some examples, the forward portion of the robot has a substantially rectangular shape and the rearward portion of the robot has a substantially circular shape.

The straight forward surface defines a height. In some examples, the array of emitters and the array of receivers are disposed substantially along a mid-height of the forward surface. In other examples, the array of emitters are disposed at a first threshold distance from a mid-height of the forward surface, and the array of receivers may be disposed at a second threshold distance from the mid-height of the forward surface. The first threshold distance may be different than the second threshold distance.

Another aspect of the disclosure provides a method of operating an autonomous mobile robot across a floor surface. The method includes firing an array of sonar emitters and an array of sonar receivers arranged at distances along the length of a substantially straight forward surface of the robot body. Each end of the forward surface lies along a circumference traced by a circumdiameter of the robot body. Each emitter in the emitter array is disposed adjacent a receiver of the receiver array, and each emitter and receiver pair measure a distance from the forward surface to a wall. Additionally, the method includes processing sensor signals received by the array of receivers and, without the robot making contact with the wall, determining at least two distances between the forward face and the wall, as measured by two emitter and receiver pairs. The method includes calculating the angle of approach of the forward surface to the wall and calculating a closest corner distance to the wall. Once the closest corner distance reaches a threshold turning distance, the method includes turning the robot body to avoid collision, aligning the forward drive direction parallel to the wall, and positioning a side of the robot closest to the wall at a threshold wall following distance.

In some implementations, the threshold duration of time separating each sound wave emitted by one of the emitters in the array of emitters is between about 5 milliseconds and about 25 milliseconds. In some implementations, the threshold duration of time separating each sound wave emitted by one of the emitters in the array of emitters is 15 milliseconds. A sonar emission cycle separating each emitted sound wave may have a cycle completion period of time of between about 30 milliseconds and about 60 milliseconds. In some implementations, a sonar emission cycle separating each emitted sound wave has a cycle completion period of time of about 45 milliseconds The method may include repeatedly firing a side ranging sensor disposed on a side of the robot body and positioned adjacent at least one corner of the forward surface while the robot travels adjacent the wall. The side ranging sensor measures a distance to the wall, such that the robot maintains a threshold wall following distance and avoids collision while following the wall. In some implementations, the threshold wall following distance enables a side brush extending beyond the perimeter of the robot to contact the wall.

In some implementations, the method includes measuring a distance to the floor with at least one cliff sensor while the robot is turning and/or driving in reverse. If the cliff sensor detects a cliff, the control system stops the robot from driving and/or turning.

Another aspect of the disclosure provides a method of operating an autonomous mobile robot across a floor surface along a path. The method includes emitting a sound wave from an emitter disposed on a robot body defined by the robot and executing on a computing processor a behavior system. The behavior system receives a sensor signal from a receiver disposed on the robot body and executes at least one behavior based on the sensor signal. The sensor signal is indicative of sound wave reflections received by the receiver. If the robot is maneuvering across a surface, the behavior system executes a sonar emission cycle having a threshold duration of time (e.g., 15 milliseconds) separating each emitted sound waves. The sonar emission cycle may have a cycle completion period of time of 45 milliseconds.

In some implementations, the method further includes executing a wiggle drive command if the robot receives a sensor signal indicating a presence of an obstacle in the path of the robot. The wiggle command includes a series of alternating right and left drive commands each angled with respect to a forward drive direction by a corresponding wiggle angle. The wiggle angles of the corresponding right and left drive commands may be different.

The method may further include executing a wall following behavior having a wall following distance greater than an overhang distance if the robot receives a sensor signal indicating a presence of a wall. The wall following distance is a distance between the robot body and the wall, and the overhang distance is a distance between the wall and the overhang. During execution of the wall following behavior the robot may drive at a threshold distance away from the wall. The sonar emission cycle may have a cycle completion period of time equal to the threshold duration of time.

In some implementations, the method further includes executing a direction-lock drive command if the computing processor receives a sensor signal that indicated that the robot is in a corner formed by two walls. The direction-lock command avoids a recently traveled path until the robot travels a threshold distance.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7A is a perspective view of an exemplary autonomous mobile robot for cleaning.

FIGS. 8A-8C are alternative front views of the robot shown in FIG. 1.

FIG. 10A is a top view of an exemplary autonomous robot as it approaches a wall head on.

FIG. 10B is a top view of a sonar signal ranging to a wall.

FIG. 10C is a top view of an exemplary autonomous robot as it approaches a wall at an angle and turns to reposition without contacting the wall.

Like reference symbols in the various drawings indicate like elements.

DETAILED DESCRIPTION

An autonomous robot movably supported can navigate a floor surface using a sensor system that allows the robot to discern its surroundings. In some examples, the robot determines a local perceptual space (LPS) about the robot, which is a virtual space representative of the robot's environment and resolved using one or more sensors on the robot.

Figure 6A:
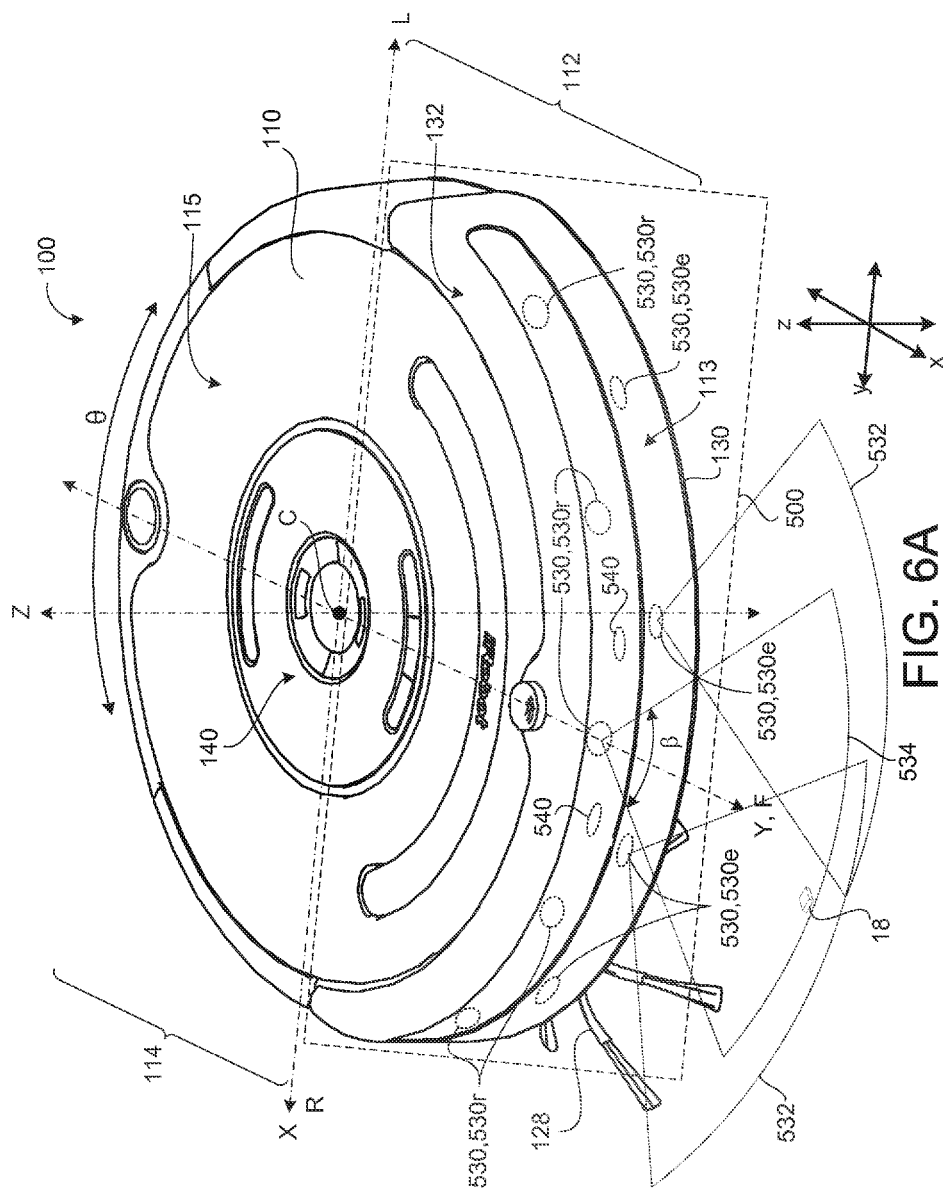
FIG. 6A is a top perspective view of an exemplary autonomous mobile robot.
Figure 6B:
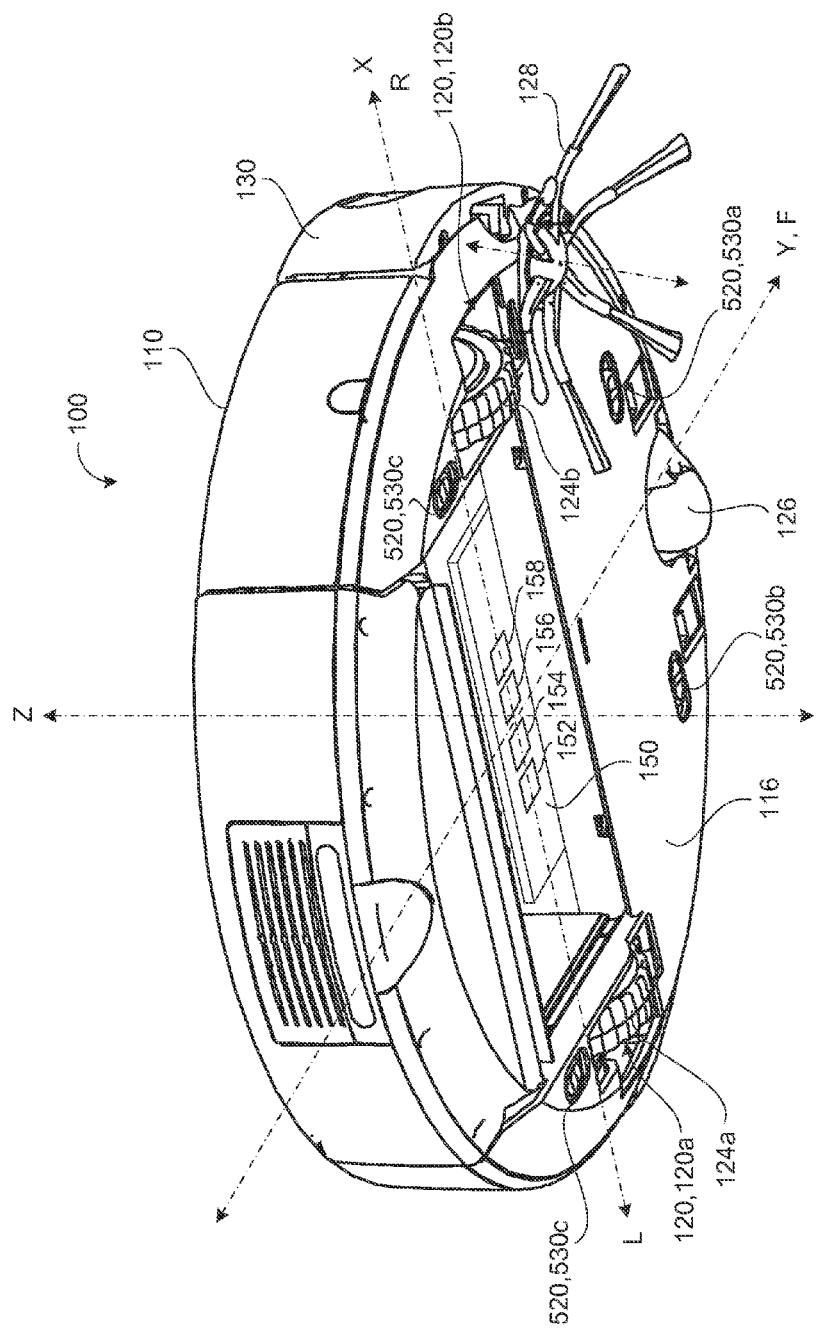
FIG. 6B is a bottom perspective view of the robot shown in FIG. 6A.

Referring to FIGS. 1-6B, in some implementations, a robot 100 includes a body 110 supported by a drive system 120 that can maneuver the robot 100 across a floor surface 10 based on a drive command having x, y, and θ components, for example. The robot body 110 has a forward portion 112 and a rearward portion 114. FIGS. 1-5 illustrate an exemplary robot 100 having a rectangular forward portion 112 and rounded rearward portion 114. The forward portion 112 may have a substantially straight forward surface 113 and/or a forward surface 113 that is substantially parallel to a transverse axis X defined by the body 110. FIGS. 6A and 6B illustrate an exemplary robot 100 having rounded (e.g., circular) forward and rearward portions 112, 114 of the robot body 110.

The drive system 120 includes right and left driven wheel modules 120a, 120b. The wheel modules 120a, 120b are substantially opposed along the transverse axis X and include respective right and left drive motors 122a, 122b driving respective right and left wheels 124a, 124b. The drive motors 122a, 122b may releasably connect to the body 110 (e.g., via fasteners or tool-less connections) with the drive motors 122a, 122b optionally positioned substantially over the respective wheels 124a, 124b. The wheel modules 120a, 120b can be releasably attached to the body 110 and spring biased into engagement with the cleaning surface 10. In some examples, the wheels 124a, 124b are releasably connected to the wheel modules 120a, 120b. The wheels 124a, 124b may have a biased-to-drop suspension system (not shown), which improves traction of the wheel modules 120a, 120b over slippery floors (e.g., hardwood, wet floors). The robot 100 may include a caster wheel 126 disposed to support a forward portion 112 of the robot body 110. The robot body 110 supports a power source 102 (e.g., a battery) for powering any electrical components of the robot 100.

The robot 100 can move across a surface 10 through various combinations of movements relative to three mutually perpendicular axes defined by the body 110: a transverse axis X, a fore-aft axis Y, and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 120a, 120b.

The robot 100 can tilt about the X axis. When the robot 100 tilts to the south position it tilts toward the rearward portion 114 (sometimes referred to hereinafter as "pitched up"), and in a north position when the robot 100 tilts towards the forward portion 112 (sometimes referred to hereinafter as a change "pitched down"). Additionally, the robot 100 tilts about the Y axis. The robot 100 may tilt to the east of the Y axis (sometimes referred to hereinafter as a "right roll"), or the robot 100 may tilt to the west of the Y axis (sometimes referred to hereinafter as a "left roll"). Therefore, a change in the tilt of the robot 100 about the X axis is a change in its pitch, and a change in the tilt of the robot 100 about the Y axis is a change in its roll. In addition, the robot 100 may either tilt to the right, i.e., an east position, or to the left i.e., a west position. In some examples the robot tilts about the X axis and about the Y axis having tilt position such as northeast, northwest, southeast, and southwest. As the robot 100 is traversing a floor surface 10, the robot 100 may make a right or left turn about its Z axis (sometimes referred to hereinafter as a change in the yaw). A change in the yaw causes the robot 100 to make a right turn or a left turn while it is moving. Thus the robot 100 may have a change in one or more of it pitch, roll, or yaw at the same time.

A forward portion 112 of the body 110 may include a bumper 130, which may include the forward face/surface 113 of the robot body 110. In some examples, the bumper 130 is part of the robot body 110 and in other examples the bumper 130 is an assembly that attaches to the robot body 110. The bumper 130 detects (e.g., via one or more sensors) one or more events in a drive path of the robot 100, for example, as the wheel modules 120a, 120b propel the robot 100 across the floor/supporting surface 10. The robot 100 may respond to events (e.g., obstacles 18, cliffs, walls 24, cabinets and their overhangs 25) detected by the bumper 130 by controlling the wheel modules 120a, 120b to maneuver the robot 100 in response to the event (e.g., away from an obstacle 18). While some sensors are described herein as being arranged on the bumper 130, these sensors can additionally or alternatively be arranged at any of various different positions on the robot 100 including but not limited to the bottom side 116 of the robot (e.g., mechanical switches). The bumper 130 has a complementary shape to the forward face 113 of the robot body 110.

A top portion 115 of the body 110 may include a user interface 140 that receives one or more user commands and/or displays a status of the robot 100. The user interface 140 is in communication with a robot controller 150 carried by the robot 100 such that one or more commands received by the user interface 140 can initiate execution of a routine (e.g., a cleaning routine) by the robot 100. The controller 150 includes a computing processor 152 (e.g., central processing unit) in communication with non-transitory memory 154 (e.g., a hard disk, flash memory, random-access memory).

The robot controller 150 (executing a control system) may execute behaviors 300 that cause the robot 100 to take an action, such as maneuvering in a wall following manner, a floor scrubbing manner, or changing its direction of travel when an obstacle 18 (e.g., chair, table, sofa, etc.) is detected. The robot controller 150 can maneuver the robot 100 in any direction across the cleaning surface by independently controlling the rotational speed and direction of each wheel module 120a, 120b. For example, the robot controller 150 can maneuver the robot 100 in the forward F, reverse (aft) A, right R, and left L directions.

Figure 7B:
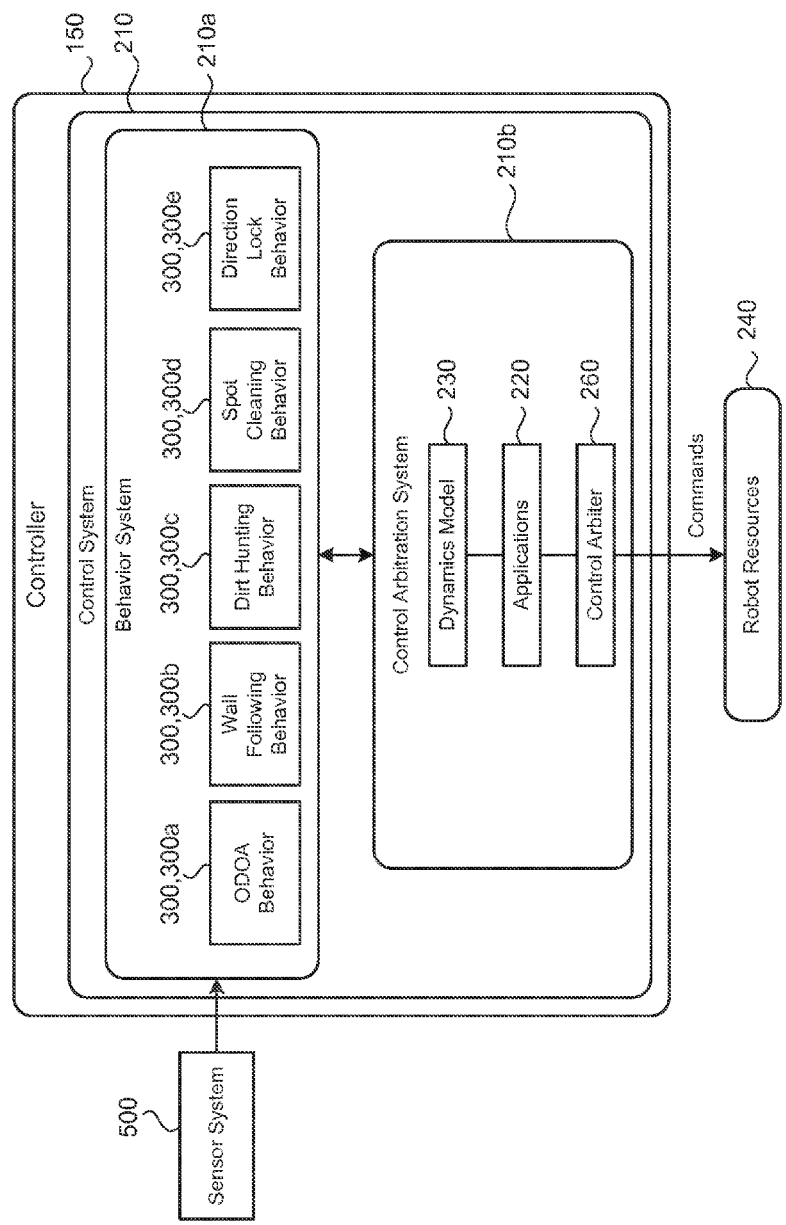
FIG. 7B is a schematic view of an exemplary control system executed by a controller of a mobile robot.

Referring to FIGS. 7A and 7B, to achieve reliable and robust autonomous movement, the robot 100 may include a sensor system 500 having several different types of sensors 520, 530, 535 that can be used in conjunction with one another to create a perception of the robot's environment (a local perceptual space) sufficient to allow the robot 100 to make intelligent decisions about actions to take in that environment. The sensor system 500 may include one or more types of sensors 520, 530, 535 supported by the robot body 110, which may include obstacle detection obstacle avoidance (ODOA) sensors, communication sensors, navigation sensors, etc. For example, these sensors 520, 530, 535 may include, but not limited to, proximity sensors, contact sensors, a camera (e.g., volumetric point cloud imaging, three-dimensional (3D) imaging or depth map sensors, visible light camera and/or infrared camera), sonar, radar, LIDAR (Light Detection and Ranging, which can entail optical remote sensing that measures properties of scattered light to find range and/or other information of a distant target), LADAR (Laser Detection and Ranging), etc. In some implementations, the sensor system 500 includes ranging sonar sensors 530, proximity (e.g., infrared) cliff sensors 520, 520a-520d, contact sensors 540, a laser scanner, and/or an imaging sonar.

The robot 100 may include a cleaning system 160 for cleaning or treating a floor surface 10. In some examples, the autonomous robot 100 can clean a surface 10 while traversing that surface 10. The robot 100 may remove debris from the surface 10 by agitating the debris and/or lifting the debris from the surface 10 by applying a negative pressure (e.g., partial vacuum) above the surface 10, and collecting the debris from the surface 10. The cleaning system 160 may include a dry cleaning system 160a and/or a wet cleaning system 160b. The dry cleaning system 160 may include a driven roller brush 162 (e.g., with bristles and/or beater flaps) extending parallel to the transverse axis X and rotatably supported by the robot body 110 to contact the floor surface. The driven roller brush 162 agitates debris off of the floor surface and throws or guides the agitated debris into a collection bin 163. The wet cleaning system 160b may include a fluid applicator that extends along the transverse axis X and dispenses cleaning liquid onto the surface.

Figure 1:
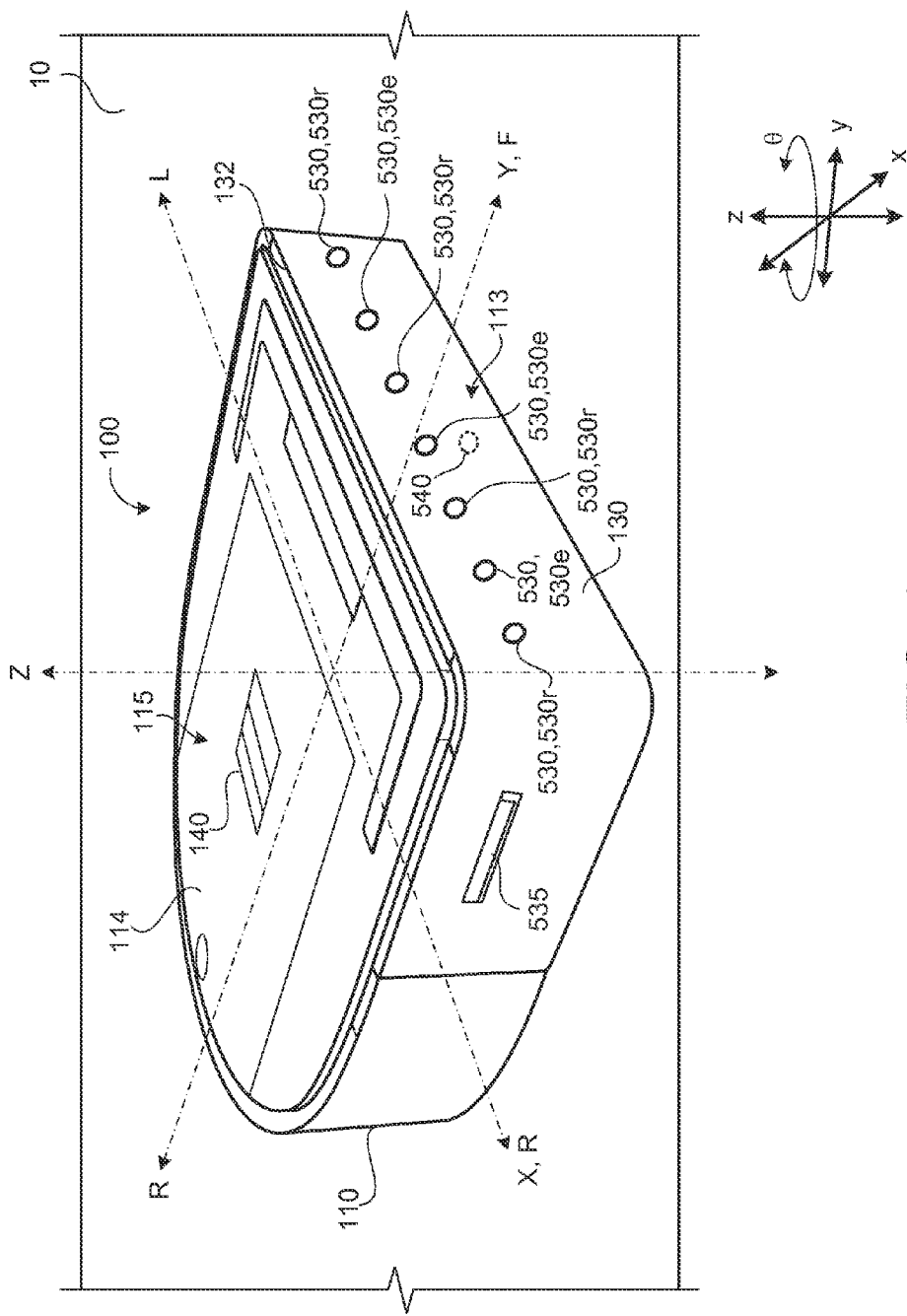
FIG. 1 is a perspective view of an exemplary autonomous mobile robot.
Figure 2:
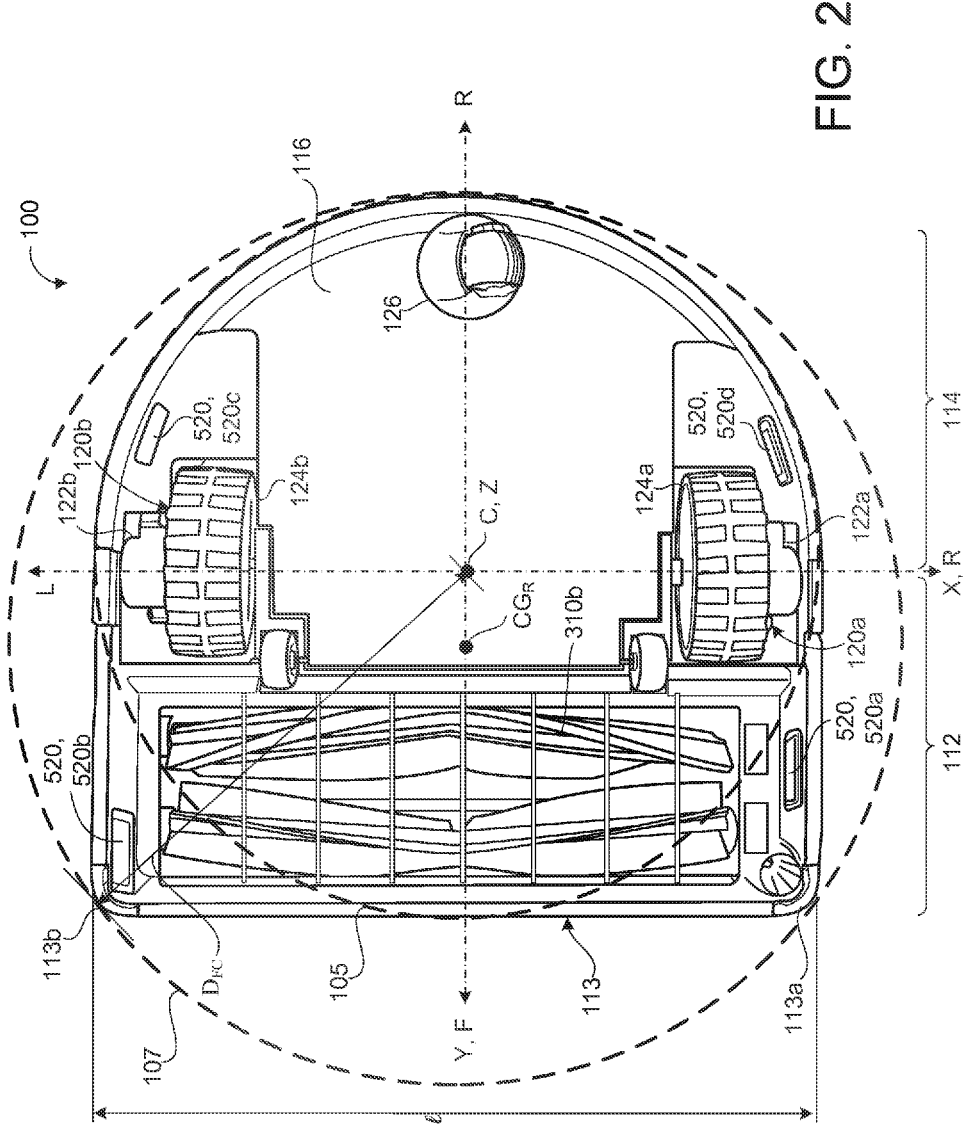
FIG. 2 is a bottom view of the robot shown in FIG. 1.
Figure 3:
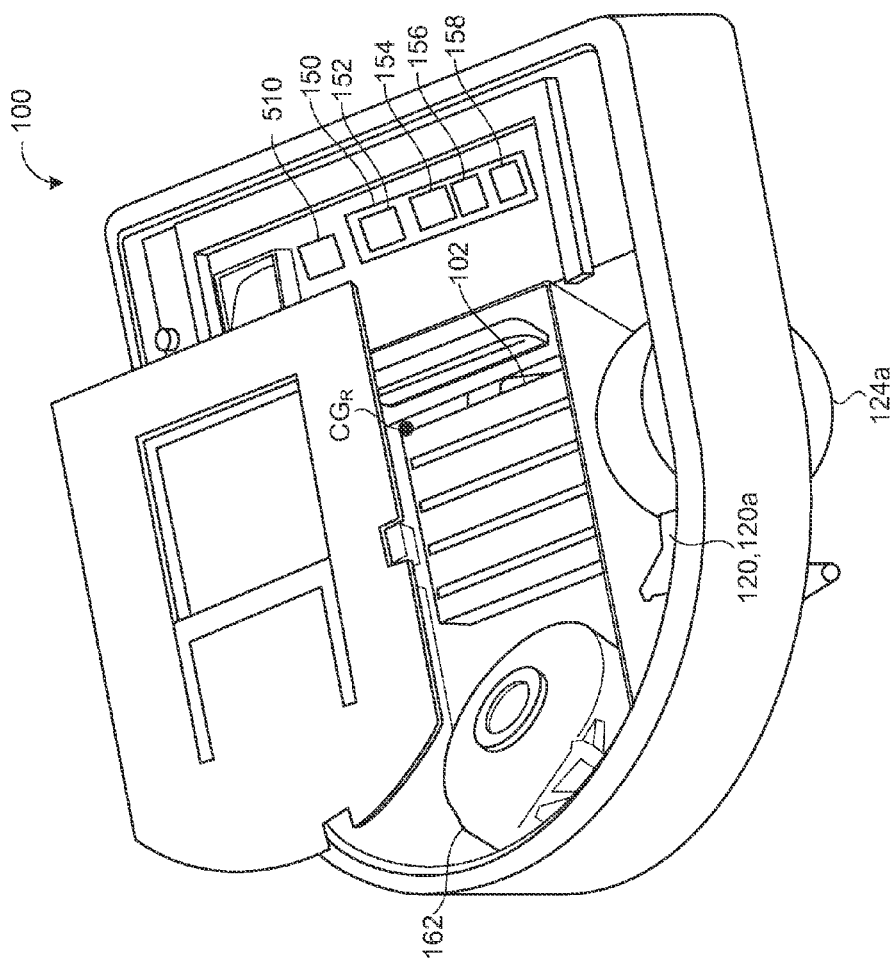
FIG. 3 is a top perspective view of the robot shown in FIG. 1.
Figure 4:
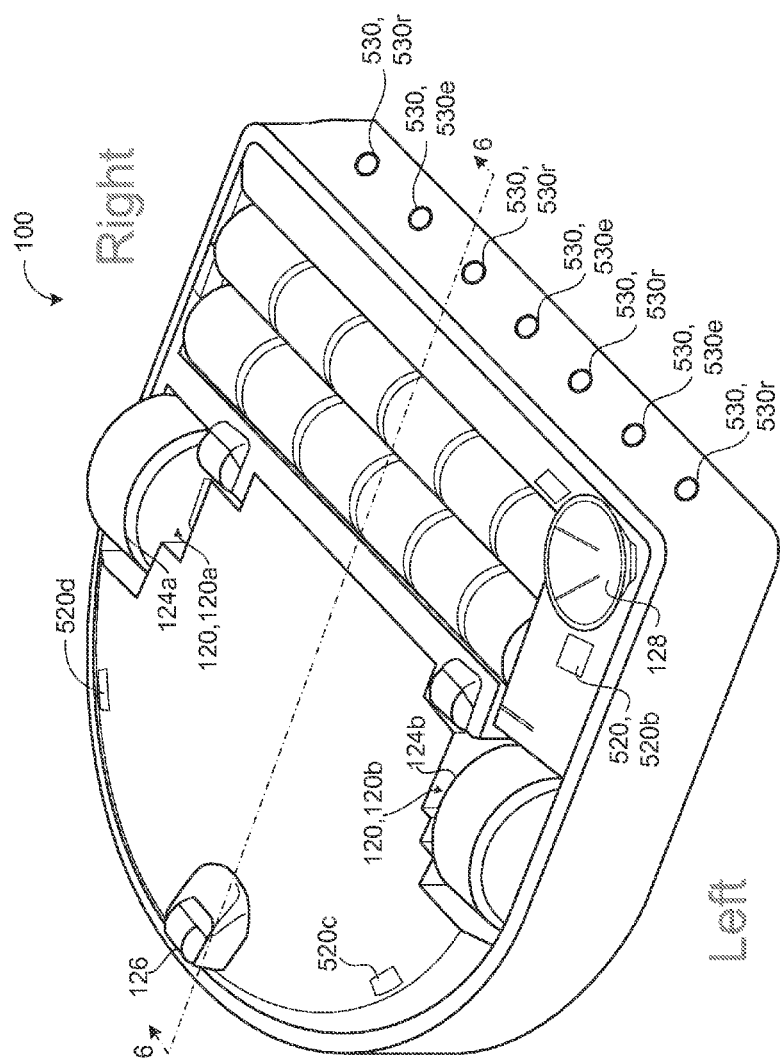
FIG. 4 is a bottom perspective view of the robot shown in FIG. 1.
Figure 5:
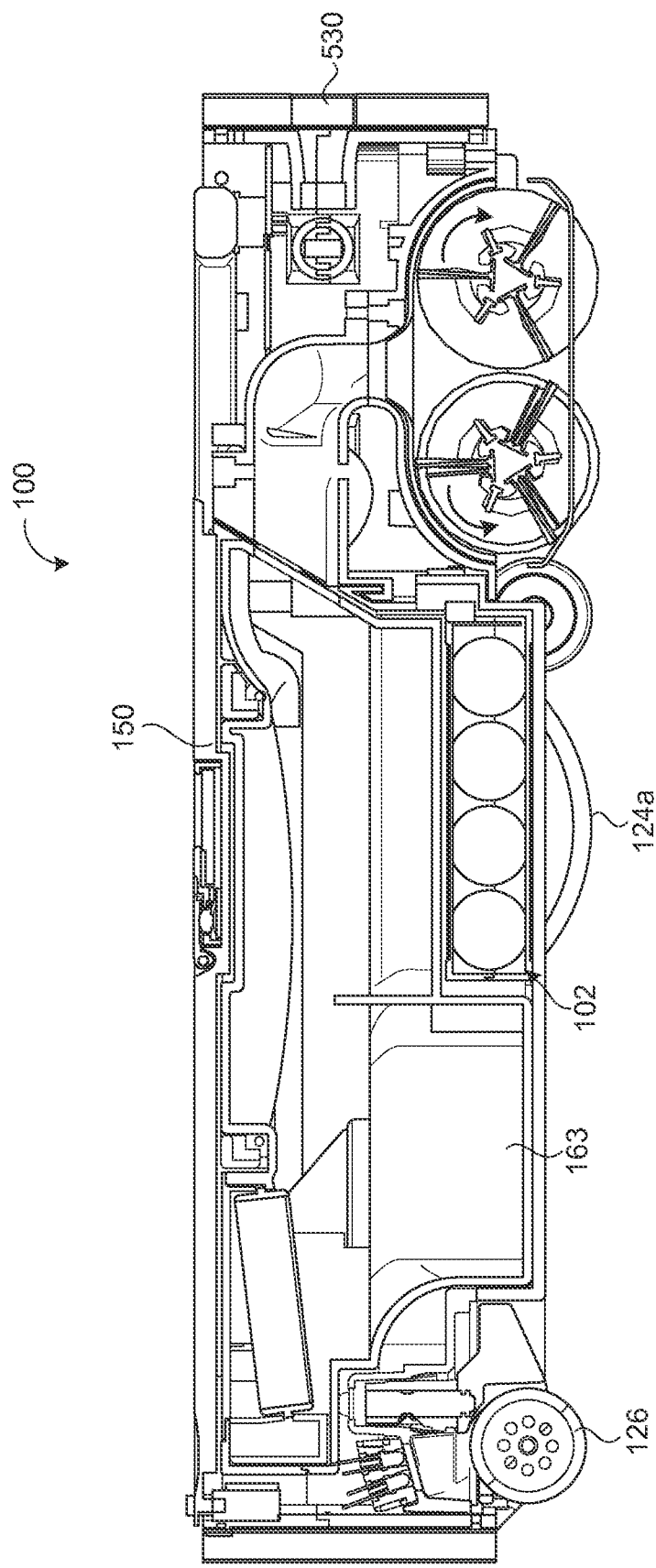
FIG. 5 is a side view of the robot shown in FIG. 1.

Referring to FIG. 3, in some examples, the sensor system 500 includes an inertial measurement unit (IMU) 510 in communication with the controller 150 to measure and monitor a moment of inertia of the robot 100 with respect to the overall center of gravity $CG_R$ of the robot 100. The controller 150 may monitor any deviation in feedback from the IMU 510 from a threshold signal corresponding to normal unencumbered operation. For example, if the robot 100 begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the controller 150 may take into account a moment of inertia of the robot 100 from its overall center of gravity $CG_R$ to prevent robot tipping. The controller 150 may use a model of its pose, including its current moment of inertia. When payloads are supported, the controller 150 may measure a load impact on the overall center of gravity $CG_R$ and monitor movement of the robot moment of inertia. If this is not possible, the controller 150 may apply a test torque command to the drive system 120 and measure actual linear and angular acceleration of the robot using the IMU 510, in order to experimentally determine safe limits.

The IMU 510 may measure and monitor a moment of inertia of the robot 100 based on relative values. In some implementations, and over a period of time, constant movement may cause the IMU to drift. The controller 150 executes a resetting command to recalibrate the IMU 510 and reset it to zero. Before resetting the IMU 510, the controller 150 determines if the robot 100 is tilted, and issues the resetting command only if the robot 100 is on a flat surface.

Referring to FIG. 7A, in some implementations, the robot 100 includes a navigation system 200 configured to allow the robot 100 to navigate the floor surface 10 without colliding into obstacles 18 or falling down stairs, and in the case of a cleaning robot 100 to intelligently recognize relatively dirty floor areas for cleaning. Moreover, the navigation system 200 can maneuver the robot 100 in deterministic and pseudo-random patterns across the floor surface 10. The navigation system 200 may be a behavior based system stored and/or executed on the robot controller 150. The navigation system 200 may communicate with the sensor system 500 to determine and issue drive commands to the drive system 120. The navigation system 200 influences and configures the robot behaviors 300, thus allowing the robot 100 to behave in a systematic preplanned movement. In some examples, the navigation system 200 receives data from the sensor system 500 (e.g., an inertial measurement unit 510, infrared sensors 520, 520a-520d, and sonar sensor(s) 530, 535) and plans a desired path for the robot 100 to traverse.

Referring to FIGS. 3 and 7B, in some implementations, the controller 150 (e.g., a device having one or more computing processors 152 in communication with non-transitory memory 154 capable of storing instructions executable on the computing processor(s) 152) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory or communicated to the robot 100, to run concurrently on (e.g., on a processor) and simultaneously control the robot 100. The applications 220 may access behaviors 300 of the behavior system 210a. The independently deployed applications 220 are combined dynamically at runtime and to share robot resources 240 (e.g., drive system 120 and/or cleaning systems 160, 160a, 160b). A low-level policy is implemented for dynamically sharing the robot resources 240 among the applications 220 at run-time. The policy determines which application 220 has control of the robot resources 240 as required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 210b includes one or more application(s) 220 in communication with a control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220 generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions. A dynamics model 230 executable on the controller 150 is configured to compute the center for gravity ($CG_R$), moments of inertia, and cross products of inertia of various portions of the robot 100 for the assessing a current robot state.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210a includes an obstacle detection/obstacle avoidance (ODOA) behavior 300a for determining responsive robot actions based on obstacles 18 (FIG. 9B) perceived by the sensor system 500 (e.g., turn away, turn around, stop before the obstacle 18, etc.). Another behavior 300 may include a wall following behavior 300b for driving adjacent a detected wall 24 (e.g., in a wiggle pattern of driving toward and away from the wall). Other behaviors 300 may include a dirt hunting behavior 300c (where the sensor(s) detect a dirty spot on the floor surface and the robot 100 veers towards the spot for cleaning), a spot cleaning behavior 300d (e.g., the robot follows a cornrow pattern to clean a specific spot), a direction lock behavior 300e, a cliff behavior (e.g., the robot detects stairs and avoids falling from the stairs), a stasis behavior, an anti-tilt behavior, and anti-ingestion behavior, an anti-wheel jam behavior.

There are several challenges involved in placing sensors 520, 530 on a robotic platform. First, the sensors 520, 530 need to be placed such that they have maximum coverage of areas of interest around the robot 100. Second, the sensors 520, 530, 535 may need to be placed in such a way that the robot 100 itself causes an absolute minimum of occlusion to the sensors; in essence, the sensors cannot be placed such that they are "blinded" by the robot 100 itself. Third, the placement and mounting of the sensors 520, 530 should not be intrusive to the rest of the industrial design of the platform. In terms of aesthetics, it can be assumed that a robot 100 with sensors 520, 530, 535 mounted inconspicuously is more "attractive" than otherwise. In terms of utility, sensors 520, 530, 535 should be mounted in a manner so as not to interfere with normal robot operation (snagging on obstacles, etc.).

Referring to FIGS. 3 and 8A-9B, in some implementations, the sensor system 500 includes a sonar system 530. Sonar is the acronym for Sound Navigation and Ranging, and it is a technique that utilizes sound to navigate in an environment. The sonar system 530 uses sound propagation to detect obstacles 18a-18d in the path of robot 100. Sonars may be of two types, active sonars and passive sonars. Passive sonars listen to sounds made by other obstacles 18, while active sonars emit pulses of sounds and listen for the echoes the pulses produce when they reflect off the obstacle 18. The sonar system 530 is active sonar that includes an emitter 530e, a receiver 530r, a transducer 156, and a signal processor 158. An electrical pulse transmitted from the sonar emitter 530e is converted into a sound wave by the transducer 156 and propagates in a given direction. The distance to an object 18 from the sonar emitter 530e may be measured because of the constant and known speed of sound. The time lapse between the transmitted signal and the received signal after it bounces back from the object 18 may be measured, which leads to calculating the distance to the object which produced the bounce back of the emitted sound wave.

In some implementations, the sonar system 530 includes an array of emitters $530e_1$-$530e_3$ and an array of receivers $530r_1$-$530r_4$. As shown in FIGS. 8A-8C, the array of emitters includes three emitters 530e and the array of receivers includes four receivers 530r. Each emitter 530e is disposed between two receivers 530r. The emitters 530e and receivers 530r are disposed on the bumper 130 of the robot body 110 or the forward face 113 of the robot body 110. The emitters 530e and receivers 530r are arranged adjacent to one another along the forward peripheral face 113 of the robot body 110. In some examples, the bumper 130 or the forward face 113 of the robot 100 has a height $D_T$ that extends from the top portion 115 to a bottom portion 116 of the robot body 110. In some examples, the array of emitters 530e and receivers 530r are arranged adjacent a longitudinal medial line L about half way up the forward face 113. If the robot body 100 has a square front portion, the sonar system 530 may be arranged in a straight line parallel to the transverse axis X. The emitters 530e and receivers 530r may be arranged at a mid-height $D_M$ of the bumper height $D_T$ in a straight line (FIG. 8A). The mid-height $D_M$ being half the bumper height $D_T$.

Referring to FIGS. 8B and 8C, the emitters 530e and receivers 530r may each be arranged in a straight line spaced along and parallel to the transverse axis X, where the emitters 530e and receivers 530r are separated by a vertical distance $D_S$. The emitters 530e are at a vertical distance $D_E$ from the mid-height $D_M$ of the bumper 130 and the receivers 530r are at a vertical distance $D_R$ from the height $D_M$ of the bumper 130. The emitters 530e and the receivers 530r may be separated by a vertical distance $D_S$ from each other. In some examples, each emitter $530e_1$ is positioned along the front face 113 at a horizontal distance $\mathcal{E}$ from the nearest neighboring emitter $530e_2$ in the array of emitters 530e, and each receiver 530 $r_3$ is positioned along the front face 113 at a horizontal distance $\mathcal{R}$ from the nearest neighboring receiver $530r_4$ in the array of receivers 530r. In some examples, each emitter $530e_2$ is positioned along the front face at a horizontal distance $\mathcal{ER}$ from the nearest neighboring receiver $530r_3$. Other emitter 530e and receiver 530r arrangements may also be possible. In addition, the emitters 530e and the receivers 530r may be disposed on other portions of the robot body 110, such as right and left sides of the robot body 110, a back side of the robot body 110, or any other appropriate location.

Figure 9A:
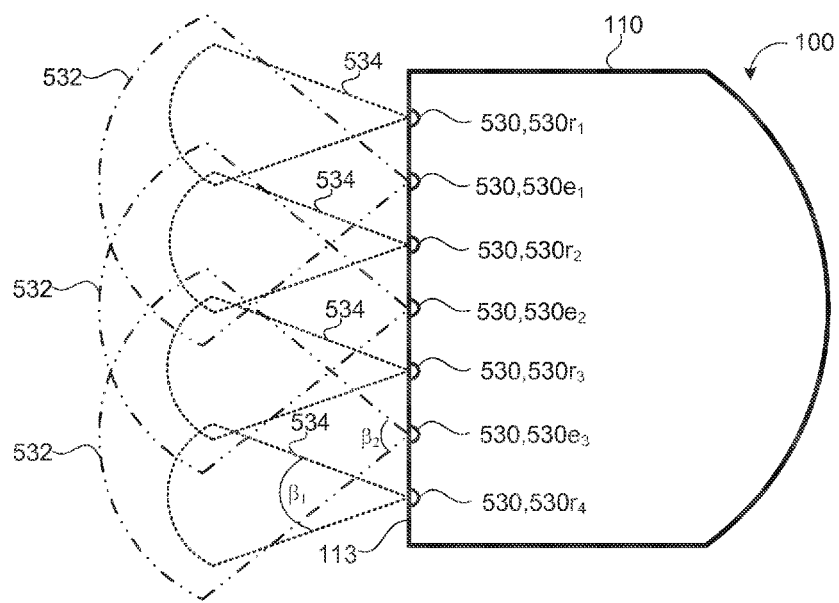
FIGS. 9A and 9B are top views of exemplary autonomous robots having a sonar system.
Figure 9B:
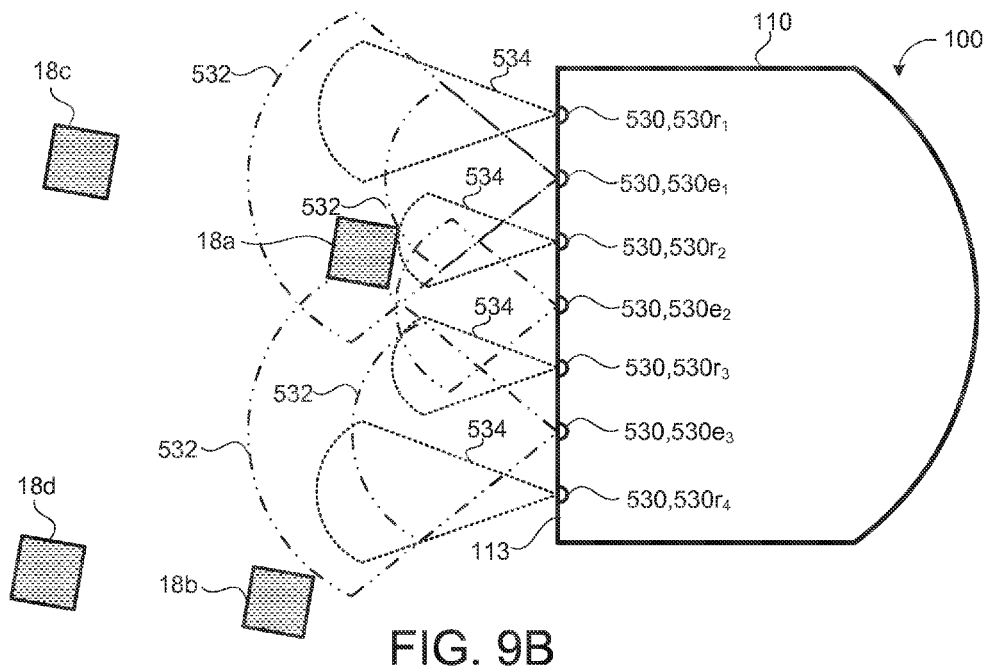

Referring to FIGS. 9A and 9B, the sonar system 530 may be disposed on an upper portion 132 (see FIG. 1) of the bumper 130 and/or on the front face 113 of the bumper 130. The sonar system 530 includes emitters 530e arranged to emit sound waves 532 and receivers 530r arranged to receive the reflection of the emitted sound waves 532 in a receiving wave field 534. The emitters 530e and the receivers 530r are arranged along the forward drive direction F. The emitted sound waves 532 and the received sound waves 534 may each have an angle $\beta_1$, $\beta_2$ of between about 45° and about 270°. Moreover, the sonar system 530 may emit sound waves in a side-to-side and/or up-and-down fan-out direction with respect to the forward drive direction F.

In some examples, the sonar system 530 includes different sequences for emitting sound waves. The sensor system 500 may emit an emitted sound wave 532 from each of the sonar emitters $530e_1$-$530e_3$ simultaneously and therefore receive the reflected wave 534 simultaneously. The sonar emitters $530e_1$-$530e_3$ fired simultaneously each have a distinct and distinguishable frequency so that a distance measured by each of the receivers $530r_1$-$530r_3$ is received and identified by position of the emitter 530e along the longitudinal medial line L of the front face 113 of the robot 100. In some examples, the sonar system 530 may emit an emitter wave 532 from a first emitter 530e and after a threshold duration of time (e.g., 1 msec, 2 msec, 3 msec, . . . . 20 msec) the sonar system 530 emits a second emitter wave 532 from a second emitter 530e. In some examples, the control system 210 executes a sonar emission cycle having a threshold duration of time (e.g., 1 msec, 2 msec, 3 msec, . . . 20 msec) separating each emitted sound wave. The sonar emission cycle is the time required for each emitter 530e on the robot body 110 to emit a sound wave 532. In some examples, the time between emissions from two neighboring emitters 530e is between about 5 milliseconds and about 25 milliseconds. In some examples, the time between emissions from two neighboring emitters 530e is about 15 milliseconds. Moreover, the sonar emission cycle may have a cycle completion period of time of between about 30 milliseconds and about 60 milliseconds. In some examples, the sonar emission cycle has a completion period of time of 45 milliseconds.

In some implementations, the sonar system 530 includes three emitters $530e_1$-$530e_3$ and four receivers $530r_1$-$530r_4$, as shown in FIGS. 9A and 9B. The four receivers 530r are disposed equidistantly horizontally from one another on the bumper 130 and are separated by the emitter 530e disposed halfway between two receivers 530r. The sensor system 530 emits a sound wave 532 every 15 milliseconds; therefore, a complete sonar emission cycle takes 45 milliseconds for all the emitters 530e to send a sound wave 532. FIG. 9B shows the sound wave emitted from the emitters 530e hitting an obstacle 18 and the receivers 530r receive the reflected sound wave. When the receivers 530r receive the reflected sound waves 532, the signal processor 158 processes the received sound waves 532.

Robots 100 having a square front or flat forward face 113 (e.g., FIGS. 1-5) cannot simply turn in place to move away from an obstacle 18, such as a wall, without collision, as round robots do. The peripheral edge of a round robot 100 (e.g., FIGS. 6A and 6B) is equidistant to the center C of the robot 100 at every position along the robot's circumference. The forward face 113 of a square front robot 100, however, extends beyond a profile circle 105 (shown in dashed line in FIG. 2) centered about the center C of the robot 100 and traced in part along the peripheral edge of the round reward portion 114 of the robot 100. Turning in place without the corners 113a, 113b of the forward face 113 colliding with an obstacle, such as a wall 24, may require knowing the distance of the front face 113 of the robot 100 from the obstacle 18 and the angle of approach α. The profile 105 has a set diameter dimension and a set corner distance $D_{FC}$ from the center C to each of the corners 113a, 113b of the forward face 113.

Having sonar sensors 530 on the forward face 113 of the robot 100 in combination with a side sensor 535 provides an elegant navigation advantage to square front robots encountering walls 24 and other obstacles 18 without having to collide repeatedly with the obstacles 18 to actuate a bump sensor 540 of the bumper 130. The sonar sensors 530 in combination with a side sensor 535 enables a square front robot 100 to navigate around an obstacle 18 or series of obstacles 18 without collision. Additionally, the sonar sensors 530 enable the square front robot 100 to alight with a wall without making contact and travel adjacent a wall 24 without collision. The amount that such a robot 100 needs to turn to move away from a wall 24 or align with a wall 24 for wall-following alongside the wall 24 depends on an angle of approach α or φ the robot 100, which can be determined from measurements made by the array of sonar sensors 530 on the forward face 113.

Referring to FIGS. 10A and 10B, in some implementations, when the robot 100 approaches a wall 24 head on and emits signals (emitter wave 532) from the emitters $530e_1$-$530e_3$, the receivers $530r_1$-$530r_4$ register the shortest distance $D_{min}$ to the wall 24 detected by each emitter wave 532. In the head on approach of FIG. 10A, $D_{min}$ is equal for each of the emitters $530e_1$-$530e_3$, and the robot 100 elegantly turns or backs away from the wall 24 to avoid a collision, depending on whether the distance to the wall $W_D$ of the front face 113 is greater than or less than a threshold turning distance $W_T$. If the sonar sensors 530 register shortest distances $D_{min}$ of the emitters $530e_1$-$530e_3$ as a distance measurement $W_D$ along the length of the front face 113 that is below a threshold distance $W_T$, the robot 100 is too close to the wall 24 to turn without colliding with the wall 24. The robot 100 uses the distance $W_D$ measured by the sonar sensors 530 to determine a reverse direction distance to the threshold turning distance $W_T$. The robot 100 backs away from the wall 24 to the threshold turning distance $W_T$ before turning to prevent a corner 113a, 113b of the front face 113 from colliding with the wall 24. Because the sonar sensors 530 provide distance measurements and the robot 100 is of known dimensions with the sonar sensors 530 placed in known positions on the robot body 110, the robot 100 backs up only as far as it needs to turn without colliding with a detected obstacle 18, 24.

In some examples, the robot 100 has front cliff detectors 520a, 520b (e.g., infrared sensors) disposed adjacent the front corners 113a, 113b of the front face 113 and rear cliff detectors 520c, 520d (e.g., infrared sensors) positioned rearward of the wheels 120b, 120a. When the robot 100 backs up, the rear cliff detectors 520c, 520d can detect a cliff behind or to either side of the robot 100. The controller 150 may execute an avoidance behavior 300 based on signals received from the cliff detectors 520a-d, thus prevent the robot 100 from dropping off of the cliff. When the robot 100 executes a turn T, one or more of the front cliff detectors 520a, 520b and/or one or more of the rear cliff detectors 520c, 520d can detect a cliff behind or to either side of the robot 100.

The robot 100 may execute a turn T, rotating only the outer wheel 120a, 120b in reverse and/or rotating the wheels 120a, 120b in reverse at different rates such that the robot 100 backs up to a position in which the front face 113 is angled to the wall 24. In some examples, the front face 113 may be angled at an angle α of 45 degrees with respect to the wall 24, as shown in FIG. 10C. While the robot 100 is backing up and turning away from the wall 24, the emitters $530e_1$-$530e_3$ continue to emit an emission wave 532, and the robot 100 calculates distances $D_{min}$, $D_{max}$ of the emitters $530e_1$-$530e_3$ from the wall 24. The robot 100 is able to determine how much to continue backing up and turning without backing up past the threshold distance $W_T$ for avoiding collision.

Figure 10D:
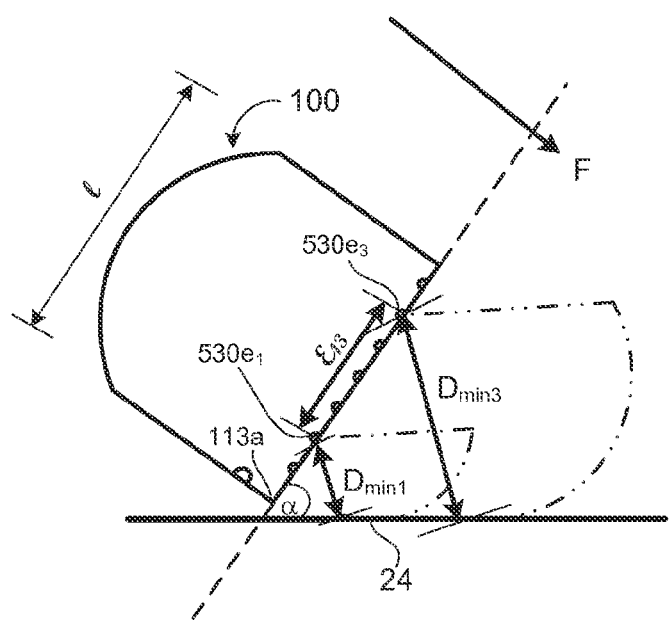
FIG. 10D is a top views of an exemplary autonomous robot as it approaches a wall at an angle and takes sensor measurements to determine how much to back up and/or turn to reposition without contacting the wall.

In some implementations, the robot 100 calculates a difference between two measured shortest distances $D_{min}$ of the emitter waves 532 from two of the emitters $530e_1$-$530e_3$, and known distances between the two emitters 530e along the front face 113 to calculate the angle α of the front face 113 with respect to the wall 24. FIG. 10D is a simplified representation of FIG. 10C with some element numbering removed for clarity. In this example, the first emitter $530e_1$ and the third emitter $530e_3$ measure respective minimum distances $D_{min1}$, $D_{min3}$ to the wall 24. The first emitter $530e_1$ and the third emitter $530e_3$ are disposed along the longitudinal medial line L of the front face 113 at a known emitter separation distance $\mathcal{E}_{13}$. Because the emitters $530e$ and receivers $530r$ are disposed at known positions along the front face 113, the robot 100 uses trigonometry to calculate the angle α of the front face 113 with respect to the wall 24. Because the front face 113 is of known dimensions, e.g., a length l, the robot 100 calculates the distance of the corners 113a, 113b to the wall 24 based on the calculated angle α and the known corner distances $\mathcal{RC}$, $\mathcal{EC}$ of the receivers $530r$ and/or emitters $530e$ to the corners 113a, 113b. When the front corner 113a of the moving robot 100 reaches a distance to the wall 24 that is at or about the threshold turning distance $W_T$, the robot 100 turns to avoid collision.

This same calculation enables the robot 100 having a square front to determine what angle is need to turn without backing up when the robot 100 approaches the wall 24 at an angle α as depicted in FIG. 10C. In this example, the robot 100 turns in place without backing up, because the distance $W_D$ of the front face 113 to the wall 24 is not less than the threshold distance $W_T$. Based on at least two measured distances $D_{min}$ of two of the emitters $530e$, the robot 100 knows its angle of approach α to the wall 24 and how far the inside corner 113a of the front face 113 is from the wall 24.

As FIG. 10D depicts, once the robot 100 aligns its forward travel direction F in parallel with the wall 24, a side sensor 535 takes sequential measurements along the wall 24 to maintain the robot 100 at a threshold wall following distance $W_F$. In some examples, the side sensor 535 is a sonar sensor with one emitter $535e$ and one receiver $535r$. In other examples the side sensor 535 is an infrared (IF) sensor with one emitter $535e$ and one receiver $535r$. In some examples, the side sensor 535 may be an IR or sonar sensor with more than one emitter $535e$ and/or more than one receiver $535r$. The side sensor 535 may be any type of ranging sensor such as, for example, IR, laser, 3D volumetric point cloud, or sonar. Using the signal received by the side sensor 535, the robot 100 executes a wall following behavior 300b, taking sequential measurements during travel to maintain the wall following distance $W_F$ such that the robot 100 travels along the wall 24 without collision. In some examples, the wall following distance $W_F$ is set to a value that enables a side brush 128 extending beyond the perimeter of the robot 100 to contact the wall 24. The robot 100 may continue emitting emission waves 532 the sonar sensors 530 along the front face 113 as the robot 100 executes the wall following behavior 300b so as to detect any obstacles 18, 24 that occupy the path of travel and require the robot 100 to turn and avoid the obstacle 18, 24 without making contact with the obstacle 18, 24.

Figure 11A:
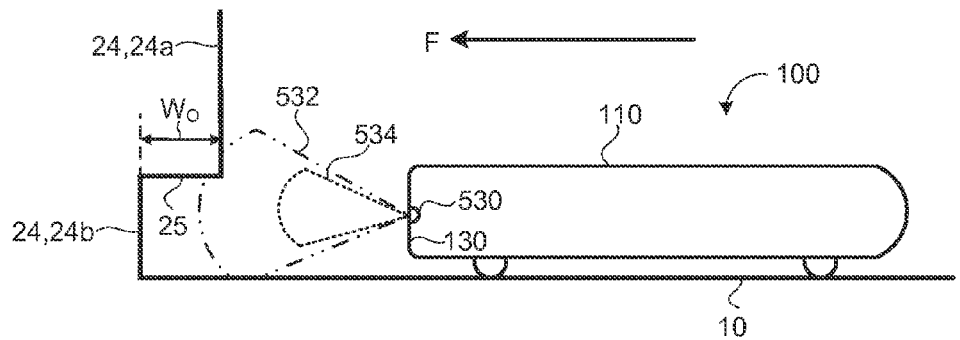
FIGS. 11A and 11B are side views of an exemplary autonomous robot as it approaches an overhang.
Figure 11B:
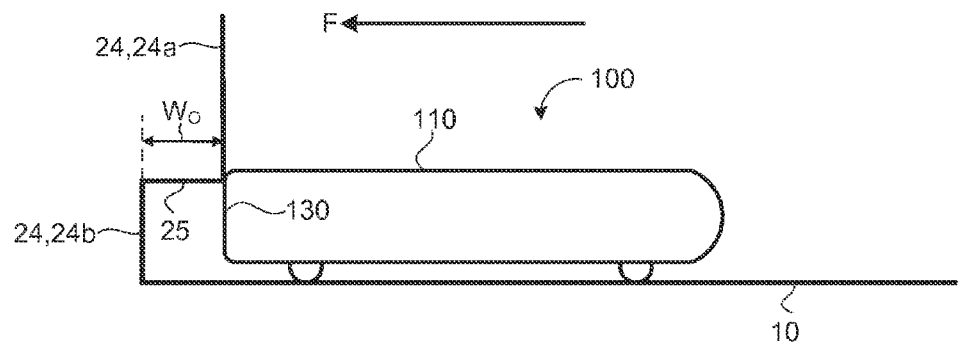
Figure 11C:
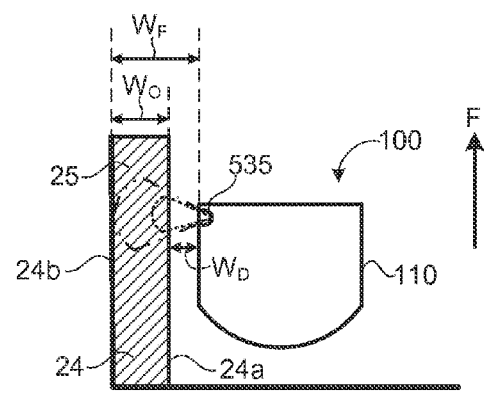
FIG. 11C is a top view of the robot of FIGS. 11A and 11B as it executes a wall-following behavior.

One particular challenge that the sonar sensor array 530 enables the robot 100 to mitigate is that of wall following along a cabinet overhang, or toe kick. Referring to FIGS. 11A-11C, in some examples, the robot 100 traverses a floor 10 and approaches a wall 24 having an overhang 25 that offsets an upper outermost wall portion 24a from a lower recessed wall portion 24b by an overhang distance $W_O$. An example of such an overhang is a kitchen or bathroom "toe-kick" commonly built into cabinetry bases to prevent stubbing toes upon approaching the cabinets. Typically, toe-kicks have a depth of at least about 3 inches and a height of about at least 3½ inches, meaning that the lower recessed wall portion 24b is about 3½ inches tall and set back by at overhang distance $W_O$ of about 3 inches from the upper outermost wall portion 24a. The control system 210 must execute a wall following behavior 300b having a wall following distance $W_F$ greater than the overhang distance $W_O$. The wall following distance $W_F$ is the distance between the robot body 110 and the recessed portion 24b (i.e. the lower portion) of the wall 24 (measured parallel to the floor 10). The overhang distance $W_O$ is the distance between the outermost wall portion 24a and the recessed wall portions 24b (measured parallel to the floor 10).

When such overhangs 25 exist in the robot's environment, the robot 100 cannot use a static threshold distance for following the wall 24, because a predetermined universal wall-following distance $W_F$ may be shorter than the overhang distance $W_O$. For the sample overhang dimensions described above, if the robot 100 had a set static wall-following distance $W_F$ to accommodate overhangs, the robot 100 would always wall follow at a distance $W_F$ of more than 3 inches, even when an overhang 25 was not present, therefore failing to clean up close to a wall 24 having no overhang 25. Because the robot 100 cannot rely on a universal threshold setting to wall-follow along an overhang 25, the robot 100 responds to other sensor input(s) to determine the presence of the wall overhang 25 and effectively follow along the outermost wall portion 24a without repeatedly turning into it and making contact with it, which would impede progress of the moving robot 100.

Figure 10E:
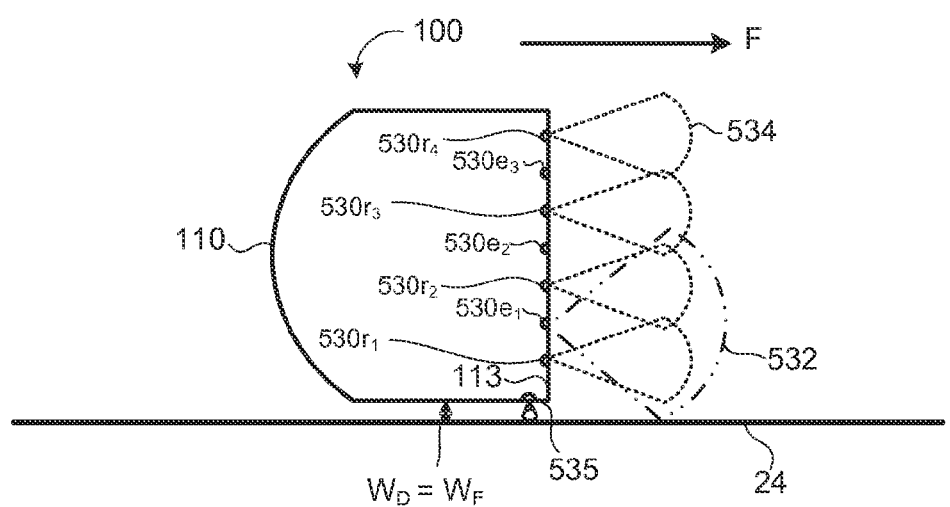
FIG. 10E is a top views of an exemplary autonomous robot as it wall-follows at a threshold distance after turning to align with the wall without making contact.

In the example shown in FIG. 11B, the robot 100 uses a contact sensor (e.g. a bumper 130) to determine when it is as close as possible to the upper, outermost portion 24a of the wall 24. At this point, the sonar sensors 530 detect the lower recessed wall 24b at a distance Wo, but the collision of the bumper 130 with the outermost upper wall portion 24a contradicts the distance measured by the sonar sensors 530. This combination of sensor signals triggers a back-up, turn, align routine described above with reference to FIGS. 10-10D. The robot 100 backs up a threshold distance to enable turning and aligning its side range sensor 535 (e.g., sonar sensor and/or IR sensor) with the wall 24b. While the robot 100 is turning, it dynamically calibrates the distance from the recessed portion of the wall 24b and chooses the threshold wall-following distance $W_F$ to travel as close to the upper outermost portion of the wall 24a without running into it. This threshold wall-following distance $W_F$ is greater when the robot is travelling along an overhang 25 than when it is travelling along a flat wall 24 having no overhang 25. During execution of the wall-following behavior 300b, the distance to the wall $W_D$ is the distance between the robot's body 110 and the closest part of the wall 24b, plus an offset that is determined by the application (e.g., to ensure a side brush 128 just touches a flat wall 24). When the robot 100 travels along a flat wall 24, as in FIG. 10D, the wall-following distance $W_F$ is equal to the desired wall distance $W_D$ for between the body 110 and the wall 24 (e.g., to ensure a side brush 128 extending beyond the perimeter of the robot 100 just touches a flat wall 24).

Figure 12A:
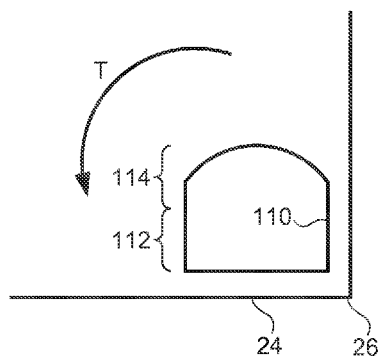
FIGS. 12A-12D are top views of an exemplary autonomous robot navigating a corner.
Figure 12B:
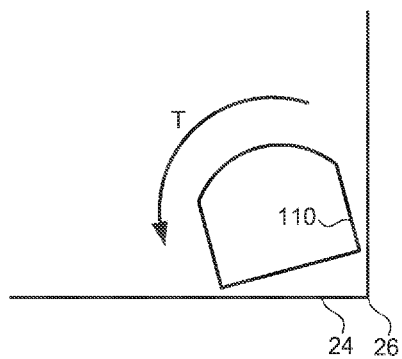
Figure 12C:
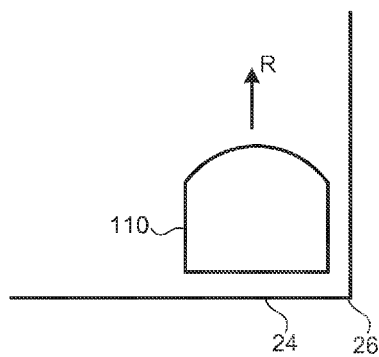
Figure 12D:
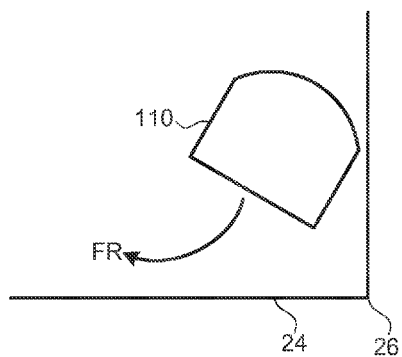
Figure 13:
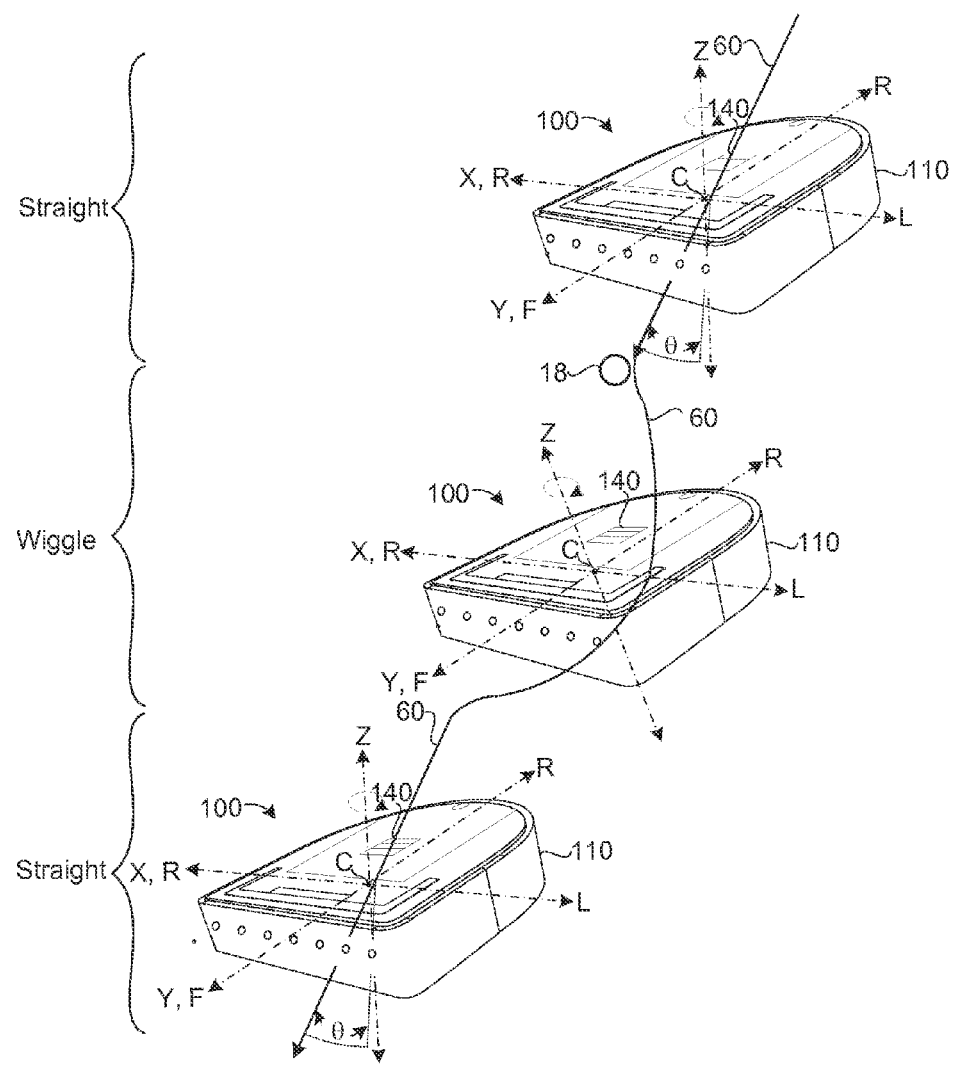
FIG. 13 is a perspective view of an exemplary autonomous robot executing a wiggle command.

Referring to FIGS. 12A-12D, the robot body 110 may have an approximately circular periphery or a partially rectangular periphery (as shown). In some implementations, the forward portion 112 of the body 110 has a rectangular periphery and the rearward portion 114 of the body 110 has a circular periphery. The rectangular forward portion 112 of the body 110 facilitates access to corners, and the circular rearward portion 114 facilitates clearing wall corners 26 when the robot 100 is making a turn within a corner 26. A robot body 110 with a partially rectangular periphery faces several challenges including escaping from obstacles separated by a distance less than the circumdiameter (the diameter $D_{FC}$ of the circle 107 that circumscribes the robot 100 and includes the front corners 113a, 113b). A robot 100 that is not round cannot turn in place to escape all obstacle configurations. When the robot 100 approaches a corner wall 26, it cannot turn in place to escape the corner 26. If the robot 100 turns in place, as in FIGS. 12A and 12B, the robot 100 may get stuck. In some implementations, the robot 100 may back out of the corner 26 in a rearward direction R, as shown in FIG. 12C, before making a turn, as shown in FIG. 12D. The robot 100 may make a front right turn FR or a front left turn. A robot 100 having sonar sensors 530, as described in the examples herein, may employ the backup, turn and align routine described with regard to FIGS. 10A-10D in this corner condition.

In some implementations, the robot 100 hits an obstacle 18a on its right side R and turns to its left L to avoid the obstacle 18. In some examples, the robot 100 then hits another obstacle 18b on its left side L. In order to avoid going back and forth between these obstacles 18, 18b, the robot 100 continues traveling along a trajectory for a set distance after turning in the original direction (left). This direction-lock command overrides the reactive behavior system 210a. When in direction-lock override mode, the control system 210 maintains a heading in the new direction regardless until the robot 100 travels a threshold distance. Because the sonar sensors 530 of the robot 100 enable contact free obstacle detection and avoidance, in some examples, the robot 100 has a direction-lock command that maintains a new heading in response to the detection of an obstacle 18 with which the robot 100 has not collided.

In some implementations, the robot 100 executes a direction-lock behavior override 300e if the sonar sensors 530 detect two obstacles within a threshold travel distance. The direction-lock behavior override 300e maintains a turning direction, regardless of obstacle side (the side of the robot 110 where the obstacle 18 exists), until the robot 100 travels a threshold distance. The direction-lock behavior override 300e allows the robot 100 to escape confined areas such as inside corners 26

The sonar sensors 530 enable the robot 100 to distinguish between walls 24 and other obstacles 18, such as chair legs 18a-18b depicted in FIG. 9B. When the sonar sensors 530 emit emission waves 532 on a wall 24, the number of return signals and the ratio of the timing of receipt are consistent. When the sonar sensors 530 emit emission waves 532 on chair legs 18a-18d, the number of return signals and the ratio of the timing of receipt are inconsistent. After distinguishing the chair legs 18a-18d from a wall 24, the robot 100 navigates around and/or through the chair legs 18a-18d and avoids colliding with the chair legs 18a, 18b in a manner that avoids sudden thrashing between robot travel headings. When the sonar sensors 530 emit emission waves 532, the robot 100 avoids the closest target obstacle detected, here chair leg 18a, by turning around the chair leg 18a and only switches direction again if a new obstacle 18b is significantly closer than the first detected object 18a. In some examples, using hysteresis, the robot 100 continues to avoid the first detected obstacle 18a when it changes direction a second time to turn around the new obstacle 18b. In this way, the robot 100 having sonar sensors 530 disposed long the front face 113 can smoothly avoid chair legs 18a-18d and other collections of non-wall, post-like obstacles. The robot 100 uses the sonar sensors 530 for contact-free obstacle avoidance and detection without thrashing between headings as it travels and potentially traveling into a field of obstacles 18 from which it cannot extract itself, because the obstacles 18 are separated by a distance less that the circumdiameter (the diameter of the circle 107 that circumscribes the robot 100 and includes the front corners 113a, 113b).

Figure 14:
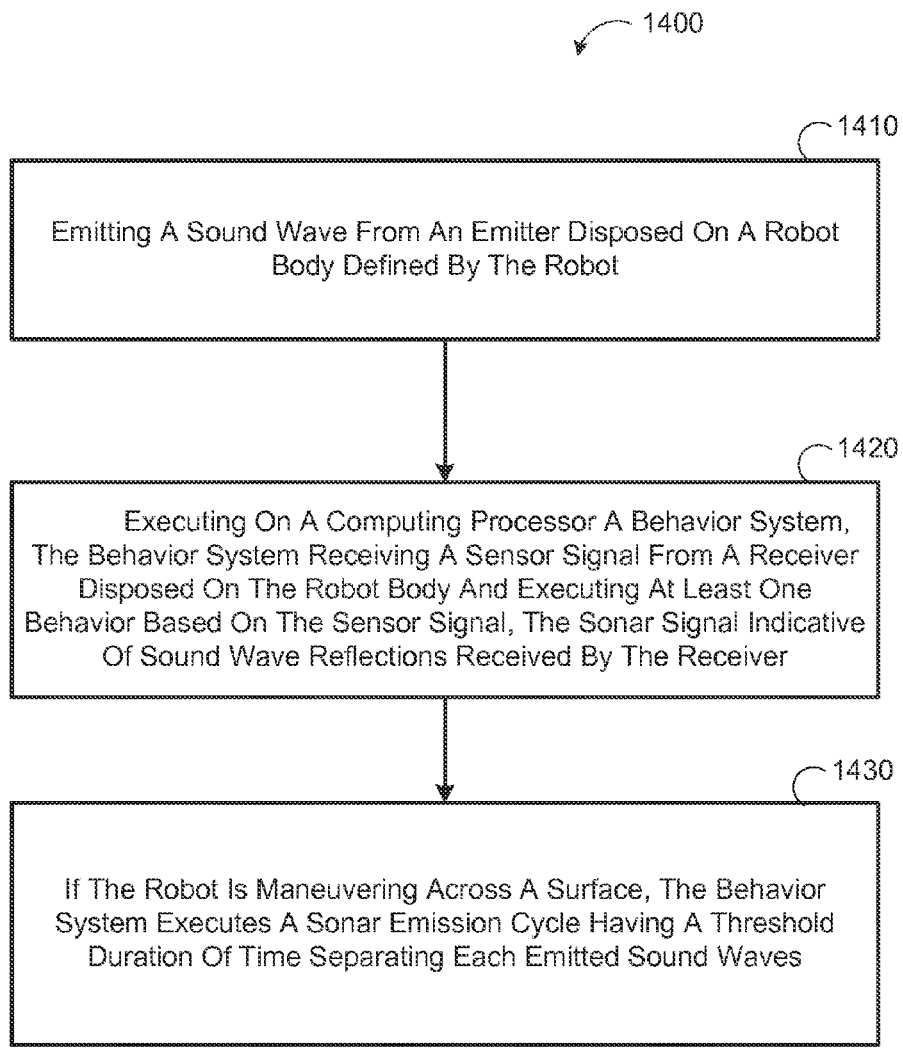
FIG. 14 is a schematic view of an exemplary arrangement of operations for operating the autonomous mobile robot.

FIG. 14 provides a method 1400 of operating a robot 100 across a floor surface 10 along a path 60. The method 1400 includes 1410 emitting a sound wave 532 from an emitter 530e disposed on a robot body 110. The method 1400 includes executing 1420 on a controller 150 (e.g., on a computing processor) a behavior system 210a (e.g., ODOA (Obstacle Detection/Obstacle Avoidance) behavior 300a, wall following behavior 300b, dirt hunting behavior 300c, spot cleaning behavior 300d, direction-lock behavior 300e). The behavior system 210a receives a sensor signal from a receiver 530r disposed on the robot body 110 and executes at least one behavior 300 based on the sensor signal. The sensor signal is indicative of sound wave reflections received by the receiver 530r. If the robot 100 is maneuvering across a surface 10, the behavior system 300 executes 1430 a sonar emission cycle having a threshold duration of time separating each emitted sound waves. The threshold duration of time may be 1 msec, 2 msec, 3 msec, . . . 20 msec. The sonar emission cycle may have a cycle completion period of time of 45 milliseconds.

The method 1400 may further include executing a wall following behavior 300b having a wall following distance $W_F$ greater than an overhang distance $W_O$ if the robot 100 receives a sensor signal indicating a presence of a wall 24. The wall following distance $W_F$ is a horizontal distance between the robot body 110 and the sensed part of the wall 24 (e.g., a lower portion 24b of the wall 24), and the overhang distance $W_O$ is a horizontal distance between an upper outmost portion 24a of the wall 24 and a the lower recessed portion 24b of the wall 24. The wall distance $W_D$ is the distance between the robot's body 110 and the closest part of the wall 24b, plus an offset that is determined by the application (e.g. to ensure a side brush 128 extending beyond the perimeter of the robot body 110 just touches a flat wall 24). During execution of the wall following behavior 300b, the robot 100 may drive at a threshold distance away from the wall 24. The robot 100 uses a side ranging sensor 535 to maintain travel at the threshold distance.

In some implementations, the method 1400 further includes executing a direction-lock behavior override 300e if the controller 150 contacts two obstacles 18 within a threshold travel distance. The direction-lock behavior override 300e maintains a turning direction, regardless of the obstacle side of the robot 100, until the robot 100 travels a threshold distance. The direction-lock behavior override 300e allows the robot to escape confined areas such as inside corners 26.

In some implementations, reasoning or control software, executable on the controller 150 (e.g., on a computing processor), uses a combination of algorithms executed using various data types generated by the sensor system 500. The reasoning software processes the data collected from the sensor system 500 and outputs data for making navigational decisions on where the robot 100 can move without colliding with an obstacle 18, for example.

Figure 15:
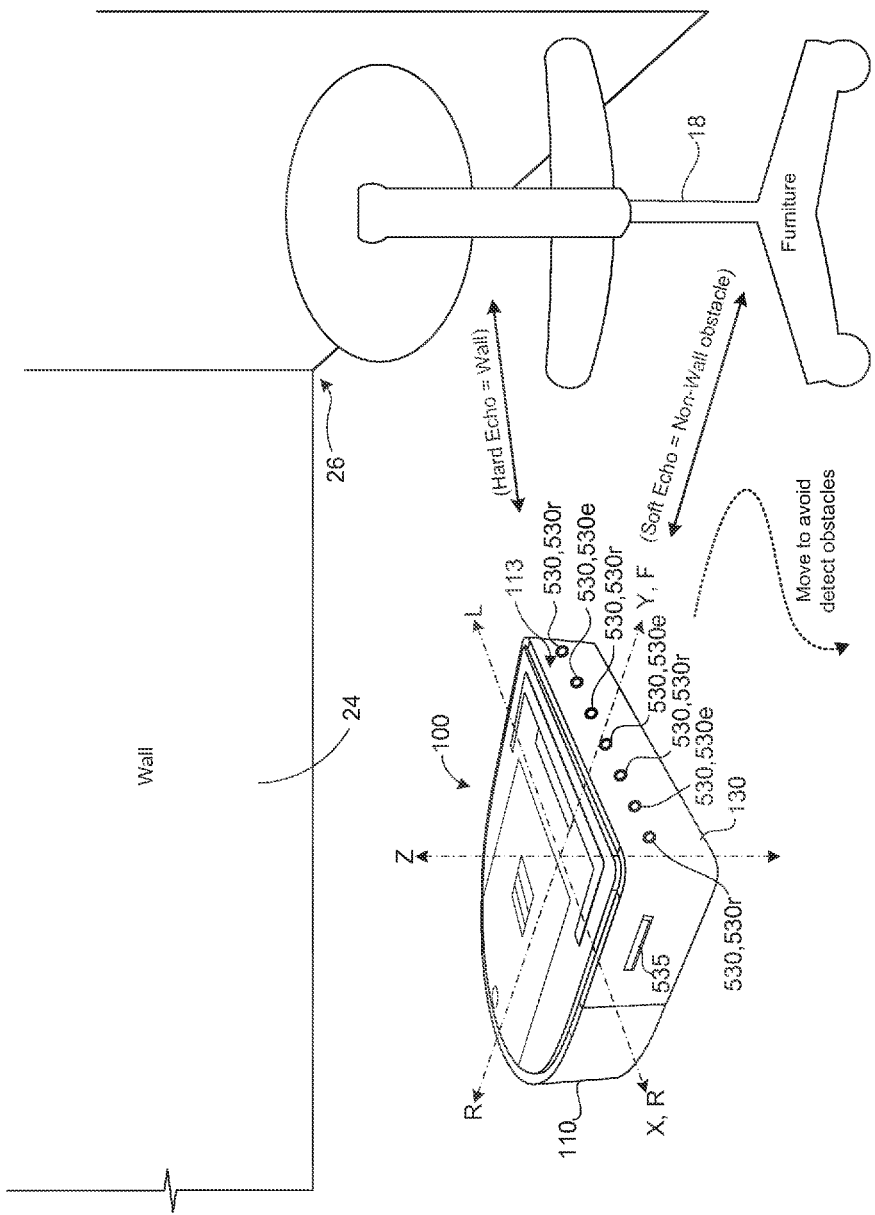
FIG. 15 is a perspective view of an exemplary autonomous robot detecting objects based on sonar echo strength.

Referring to FIG. 15, in some implementations, the robot 100 uses the sonar system 530 to distinguish between walls 24 and non-wall 18 (e.g., furniture, objects on the floor, etc.). The round robot 100 depicted in FIGS. 6A and 6B includes an array of sonar emitters 530e and an array of sonar receivers 530r disposed along its curved forward surface 113. The curved front surface 113 directs the sonar emitters and receivers 530e, 530r in directions to the right R and left L of the forward drive direction F, allowing for a relatively wider overall field of view of the sonar system 530 than on the flat front surface 113, which directs the sonar emitters and receivers 530e, 530r substantially along the forward drive direction F. On the rectangular front robot 100, sonar emitters and receivers 530e, 530r can be disposed on the right side R and the left side L of the robot body 110 to achieve a wider field of view of the sonar system 530.

The control system 210 may discern a type of detected object 18, 24 based on the strength of the sonar echo. For example, the emitted sonar signal 532 will return with a loud echo on a hard wall 24 and a soft echo on velvet or fabric furniture (non-wall obstacle) 18. The control system 210 may measure the time for an emitted wave 532 to return for determining a distance to the object 18, 24, distinguish between hard versus soft objects 18, 24, and determine where the object 18, 24 is in relation to the robot 100 based on which sonar receiver 530r receivers receives the echo signal or loudest (strongest) echo signal. This may allow the robot 100 to identify, for example, a stack of soft cords. Knowing where an object is also helps the robot 100 determine the closest target and which angle to turn away from it. In the example shown, the robot 100 discerns detection of a wall 24 based on a hard (strong) sonar echo signal received by the sonar receivers 530r. Moreover, the robot 100 determines that the wall 24 is located on its left side L, based on receiving the loudest echoes on the left most sonar receivers 530r. The robot 100 also discerns detections of a non-wall obstacle 18, in this case, a chair. The robot 100 also determines that the non-wall obstacle 18 is located straight ahead along its forward drive direction F by receiving relatively soft echo signals substantially evenly across the sonar receivers 530r (i.e., the echo signal is not stronger to the left or right sides L, R). In response to detecting the wall 24 on its left side L and the non-wall obstacle 18 straight ahead, the robot 100 (via the control system 210) maneuvers to avoid the detected obstacles 18, 24 by maneuvering to its right side R. Using the sonar system 530, the robot 100 may determine the distance and location of the detected obstacles 18, 24 relative to the robot 100 (e.g., relative to the known location of the sonar receivers 530r) and can maneuver to avoid collision with those obstacles 18, 24.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. An autonomous mobile robot comprising:
   a robot body
      defining a forward drive direction and
      having forward and rearward portions with respect to the forward drive direction,
         the forward portion having a substantially straight forward surface bounded by corners positioned along a circumdiameter of the robot body;
   a drive system
      supporting the robot body and
      configured to maneuver the robot across a floor surface;
   a sonar system disposed on the robot body,
      the sonar system comprising
         an array of sonar emitters and
         an array of sonar receivers arranged along the length of the forward surface,
         each emitter disposed adjacent a receiver and emitting a sound wave,
         each receiver capable of receiving sound wave reflections, and
         each emitter and receiver pair measuring a distance from the forward surface to a wall;
   an optical side ranging sensor disposed on a side of the robot body and positioned adjacent at least one corner of the forward surface; and
   a control system supported by the robot body and in communication with the drive system, the sonar system, and the side ranging sensor,
      the control system:
         determining an angle of approach of the forward surface to the wall based on sensor signals received from the array of sonar receivers;
         determining a closest corner distance to the wall, the corner distance measured as a shortest distance from a corner of the front surface to the wall; and
         causing the drive system to turn the robot body to avoid collision with the wall and align the forward drive direction parallel to the wall with the robot body traveling adjacent the wall at a threshold wall following distance.

2. The robot of claim 1, wherein the array of sonar emitters includes three sonar emitters and the array of sonar receivers includes four sonar receivers, the sonar emitters and the sonar receivers arranged in an alternating pattern.

3. The robot of claim 1, wherein the control system executes a sonar emission cycle having a threshold duration of time separating each emitted sound wave.

4. The robot of claim 3, wherein the threshold duration of time is 15 milliseconds or the sonar emission cycle has a cycle completion period of time of 45 milliseconds.

5. The robot of claim 1, further comprising
a bump sensor disposed on the forward portion of the robot body and in communication with a controller, actuation of the bump sensor indicating a presence of an overhang of wall closer to the robot body than a recessed portion of the wall sensed by the sonar system.

6. The robot of claim 5, wherein the control system calibrates a signal value threshold corresponding to a recessed wall following distance from the robot body to the recessed portion of the wall that allows the robot to travel adjacent the closer overhang portion of the wall at a distance equal to the threshold wall following distance.

7. The robot of claim 1, wherein when the sonar system detects a closest obstacle, the control system executes a direction-lock drive override command that maintains a turn direction until the robot travels a threshold distance, regardless of the position of the closest detected obstacle with respect to the robot.

8. The robot of claim 1, further comprising
a side brush disposed on the robot body adjacent one of the corners of the forward surface and extending beyond the perimeter of the robot body.

9. The robot of claim 1, wherein the forward portion of the robot has a substantially rectangular shape and the rearward portion of the robot has a substantially circular shape.

10. The robot of claim 1, further comprising
a cliff sensor disposed on the robot body and arranged to measure a distance to a floor beneath the robot,
the control system causing the drive system to drive in reverse or turn the robot body in response to receiving an indication of a sensed cliff from the cliff sensor.

11. A method of operating an autonomous mobile robot, the method comprising:
emitting sound waves from a sonar system,
the sonar system comprising
an array of sonar emitters and
an array of sonar receivers arranged along the length of a forward surface of a forward portion of a robot body of the robot,
the forward portion having a substantially straight forward surface bounded by corners positioned along a circumdiameter of the robot body,
each emitter disposed adjacent a receiver and emitting a sound wave,
each receiver capable of receiving sound wave reflections, and
each emitter and receiver pair measuring a distance from the forward surface to a wall;
determining, using a computing processor, an angle of approach of the forward surface to the wall based on sensor signals received from the array of sonar receivers;
determining, using the computing processor, a closest corner distance to the wall, the corner distance measured as a shortest distance from a corner of the front surface to the wall;
turning the robot body to avoid collision with the wall; and
aligning the forward drive direction parallel to the wall with the robot body offset from the wall by a threshold wall following distance.

12. The method of claim 11, further comprising executing a sonar emission cycle having a threshold duration of time separating each emitted sound wave.

13. The method of claim 12, wherein the threshold duration of time is 15 milliseconds or the sonar emission cycle has a cycle completion period of time of 45 milliseconds.

14. The method of claim 11, further comprising:
repeatedly measuring a side distance to the wall using a side ranging sensor disposed on a side of the robot body and positioned adjacent at least one corner of the forward surface; and
driving along a path substantially parallel to the wall while maintaining the threshold wall following distance.

15. The method of claim 11, further comprising:
receiving an indication of a presence of an overhang of the wall, the overhang closer to the robot body than a recessed portion of the wall; and
calibrating a signal value threshold corresponding to a recessed wall following distance from the robot body to the recessed portion of the wall to allow travel adjacent the closer overhang portion of the wall at a distance equal to the threshold wall following distance.

16. The method of claim 11, further comprising, in response to receiving detection of a closest obstacle, executing a direction-lock drive override command that maintains a turn direction until the robot travels a threshold distance, regardless of the position of the closest detected obstacle with respect to the robot.

17. The method of claim 11, wherein the threshold wall following distance enables a side brush disposed on the robot body and extending beyond a perimeter of the robot body to contact the wall.

18. The method of claim 11, further comprising measuring a distance to a floor beneath the robot using at least one cliff sensor disposed on the robot body while turning or driving in reverse.

19. The method of claim 18, further comprising driving in a reverse direction or turning direction when the cliff sensor detects a cliff.

20. The method of claim 11, wherein the forward portion of the robot has a substantially rectangular shape and a rearward portion of the robot has a substantially circular shape.

* * * * *